United States Patent
Lawrence

(10) Patent No.: US 10,238,120 B2
(45) Date of Patent: Mar. 26, 2019

(54) DOUGH FORMING PRESSING PLATE WITH SPACERS

(71) Applicant: Lawrence Equipment Inc., South El Monte, CA (US)

(72) Inventor: Eric C. Lawrence, So. El Monte, CA (US)

(73) Assignee: Lawrence Equipment Inc., South El Monte, CA (US)

( * ) Notice: Subject to any disclaimer, the term of this patent is extended or adjusted under 35 U.S.C. 154(b) by 0 days.

(21) Appl. No.: 16/047,489

(22) Filed: Jul. 27, 2018

(65) Prior Publication Data

US 2018/0332863 A1    Nov. 22, 2018

Related U.S. Application Data

(63) Continuation of application No. 14/176,276, filed on Feb. 10, 2014, now Pat. No. 10,058,102, which is a continuation of application No. 12/940,012, filed on Nov. 4, 2010, now Pat. No. 8,689,685.

(51) Int. Cl.
*G06T 7/00* (2017.01)
*B30B 15/06* (2006.01)
*A21C 11/00* (2006.01)

(52) U.S. Cl.
CPC .......... *A21C 11/006* (2013.01); *B30B 15/062* (2013.01); *G06T 7/97* (2017.01)

(58) Field of Classification Search
None
See application file for complete search history.

(56) References Cited

U.S. PATENT DOCUMENTS

| | | | |
|---|---|---|---|
| 1,016,258 | A | 2/1912 | Francis |
| 1,379,816 | A | 5/1921 | Haskel |
| 1,748,412 | A | 2/1930 | Crawford |
| 2,018,736 | A | 10/1935 | Norris |
| 2,614,590 | A | 10/1952 | Hervey |

(Continued)

FOREIGN PATENT DOCUMENTS

| | | |
|---|---|---|
| CN | 1839697 | 4/1991 |
| CN | 1052988 | 7/1991 |

(Continued)

OTHER PUBLICATIONS

"42 Inch Shimming Procedures," Lawrence Equipment, Jan. 2009, 13 pages.

(Continued)

*Primary Examiner* — Roy Y Yi
(74) *Attorney, Agent, or Firm* — Fish & Richardson P.C.

(57) ABSTRACT

In some embodiments, a dough pressing system includes means for coupling a cover to a pressing platen, wherein the cover can reduce the wear caused to the pressing platen by the heat and pressure used to process one or more products. The cover optionally can be configured to be removably attached to the pressing platen with vacuum pressure.

In some implementations, one or more spacers are placed between the cover and the pressing platen. The thickness of the spacers can adjust the thickness and diameter of products processed by the pressing platen. For example, to increase uniformity among products pressed together in a press cycle, the spacers can have different thicknesses that correspond with the location of the spacer in the pattern of dough balls.

20 Claims, 20 Drawing Sheets

(56) References Cited

U.S. PATENT DOCUMENTS

| | | | |
|---|---|---|---|
| 2,858,860 | A | 11/1958 | O'Donnell |
| 3,104,574 | A | 9/1963 | Andersen et al. |
| 3,321,807 | A | 5/1967 | O'Brien |
| 3,382,530 | A | 5/1968 | Glesner |
| 3,398,679 | A | 8/1968 | Grivet |
| 3,619,310 | A | 11/1971 | Clarke |
| 3,956,058 | A | 5/1976 | Wemhoener et al. |
| 3,980,016 | A | 9/1976 | Kimura |
| 4,053,276 | A | 10/1977 | Ahrweiler et al. |
| 4,116,119 | A | 9/1978 | Kuhlman |
| 4,164,387 | A | 8/1979 | Schermutzki et al. |
| 4,371,327 | A | 2/1983 | Fievez |
| 4,417,867 | A | 11/1983 | Bauer |
| 4,753,160 | A | 6/1988 | Baird et al. |
| 4,769,106 | A | 9/1988 | Busching |
| 4,776,789 | A | 10/1988 | Ehrich |
| 4,905,581 | A | 3/1990 | Kirkpatrick |
| 4,938,126 | A | 7/1990 | Rubio et al. |
| 4,973,240 | A | 11/1990 | Reilly |
| 5,006,358 | A | 4/1991 | Ribio et al. |
| 5,231,919 | A | 8/1993 | Lawrence et al. |
| RE34,530 | E | 2/1994 | Kirkpatrick |
| 5,300,170 | A | 4/1994 | Donohoe |
| 5,501,140 | A | 3/1996 | Balleza et al. |
| 5,649,473 | A | 7/1997 | Lawrence et al. |
| 5,918,533 | A | 7/1999 | Lawrence et al. |
| 6,083,083 | A | 7/2000 | Nishimura |
| 6,112,647 | A | 9/2000 | Brunner et al. |
| 6,244,167 | B1 | 6/2001 | McCarney |
| 6,244,941 | B1 | 6/2001 | Bowman et al. |
| 6,250,217 | B1 | 6/2001 | Korybutiak |
| 6,302,767 | B1 | 10/2001 | Tietz |
| 6,398,539 | B1 | 6/2002 | Lawrence |
| 6,638,553 | B2 | 10/2003 | Bell et al. |
| 6,835,118 | B2 | 12/2004 | Berkstresser et al. |
| 7,067,167 | B2 | 6/2006 | Damsgard et al. |
| 7,086,325 | B2 | 8/2006 | Armstrong |
| 7,229,270 | B2 | 6/2007 | Schultz |
| 7,435,593 | B2 | 10/2008 | Park et al. |
| 8,689,685 | B2 | 4/2014 | Lawrence |
| 8,746,133 | B2 | 6/2014 | Lawrence |
| 2003/0066436 | A1 | 4/2003 | Bell et al. |
| 2004/0191378 | A1 | 9/2004 | Golby et al. |
| 2005/0287240 | A1 | 12/2005 | Mattias et al. |
| 2006/0162515 | A1 | 7/2006 | Vogeley, Jr. et al. |
| 2007/0045232 | A1 | 5/2007 | Murai et al. |
| 2009/0272277 | A1 | 11/2009 | Lawrence |
| 2010/0126672 | A1 | 4/2010 | Meisser et al. |
| 2012/0114812 | A1 | 5/2012 | Lawrence |
| 2014/0096352 | A1 | 4/2014 | Lawrence |

FOREIGN PATENT DOCUMENTS

| | | |
|---|---|---|
| CN | 2290193 | 9/1998 |
| CN | 2394991 Y | 9/2000 |
| CN | 1719050 A | 1/2006 |
| CN | 200939500 Y | 8/2007 |
| EP | 0323565 | 7/1989 |
| EP | 1219174 A1 | 7/2002 |
| WO | WO 2003/030658 A1 | 4/2003 |
| WO | WO 2008/142660 | 11/2008 |
| WO | WO 2009/135123 A2 | 11/2009 |

OTHER PUBLICATIONS

"52 Inch Shimming Procedures," Lawrence Equipment, Jan. 2009, 18 pages.
"Shimming Procedures," Lawrence Equipment, Oct. 2010, 4 pages.
CasaHerrera, CH-51 Automated Inspection Systems, [Online], Retrieved from the Internet at http://www.casaherrera.com/machine-tortilla-flatbread-automated-inespection-systems on Nov. 9, 2010, 3 pages.
CasaHerrera, CH-51 Automated Inspection Systems, [Online], Retrieved from the Internet at http://www.casaherrera.com/managedocs/download.php?doc=brochure_vision-system_CH-51-Fiour.pdf on Nov. 9, 2010, 2 pages. Dated Jan. 22, 2010.
English Abstract for EP 323565 A 1.
English Translation of EP0323565A 1, www.google.com/patents/EP0323565A 1 ?cl=en, 23 pages.
Webpage Download, Amazon magnetic dato shims, 2007, www.amazon.com/Systi-Matic-56060-Magnetic-Dado-Shims/dp/BOOOHDVTXM, 3 pages.
Webpage download, Smalley, 2008, www.smalley.com/retaining_rings/about_retaining_rings.asp, 2 pages.
First Office Action dated Oct. 20, 2015, issued in related Chinese Application No. 201410361591.5, including English translation, 18 pages.
International Search Report and Written Opinion in PCT/US2009/042519, dated Apr. 27, 2010, 15 pages.
International Search Report and Written Opinion in PCT/US2011/059348, dated Apr. 3, 2012, 15 pages.
Third Office Action dated Nov. 14, 2013 from corresponding Chinese Application No. 200980125843.1, including English translation, 22 pages.
Patent Examination Report No. 1, issued in corresponding AU Patent Application No. 2014259512 on Mar. 15, 2016, 7 pages.
Patent Examination Report No. 2, issued in corresponding AU Patent Application No. 2014259512 on Aug. 4, 2016, 4 pages.
Second Office Action dated Aug. 29, 2016, issued in corresponding Chinese Application No. 201510065486.1, together with the English translation, 22 pages.
Extended European Search Report dated Nov. 25, 2016, issued in corresponding European Application No. 16178570.4, 9 pages.
Examination Report issued in India Application No. 3361/CHENP/2013, dated Jan. 22, 2019, 5 pages.

DOUGH FORMING PRESSING PLATE WITH SPACERS

CROSS-REFERENCE TO RELATED APPLICATIONS

This application is a continuation application of and claims priority to U.S. application Ser. No. 14/176,276, filed on Feb. 10, 2014, which is a continuation application of U.S. application Ser. No. 12/940,012, filed on Nov. 4, 2010, now U.S. Pat. No. 8,689,685. The contents of each application is incorporated herein by reference.

BACKGROUND

Flatbread is made from flour, water, and salt and formed into flattened dough before baking. Some flatbreads include additional ingredients such as curry powder, black pepper, olive oil, or sesame oil. The thickness of the flattened dough can range from one thirty-second of an inch to over an inch thick.

Flatbreads are made by hand or with automated equipment. For example, a factory can be used to produce one or more types of flatbread to reduce the costs of making the bread. Some automated methods of forming flatbread include die cutting, chooting, and procoing of flotbrcad dough.

Factories can include different types of tools for the different stages in the production process, such as a mixer. Some production lines have a tool to form flatbread dough into a ball and another tool to flatten the dough for baking. The flattened dough has a circular shape and a specific thickness so the flatbread will have a desired thickness after baking.

For example, a pressing apparatus presses a ball of dough until the pressed dough ball has a certain diameter. After the pressure is released from the pressed dough ball, the diameter of the pressed dough ball sometimes decreases. Changes to different process parameters, such as a heating temperature during pressing and the ingredients in the dough, sometimes have an effect on the diameter of the dough after pressing is completed. For example, a higher pressing temperature can help a pressed dough ball retain is shape.

SUMMARY

In some embodiments, a dough pressing system includes means for coupling a cover to a pressing platen, wherein the cover can reduce the wear caused to the pressing platen by the heat and pressure used to process one or more products. The cover optionally can be configured to be removably attached to the pressing platen with vacuum pressure.

In some implementations, one or more spacers are placed between the cover and the pressing platen. The thickness of the spacers can adjust the thickness and diameter of products processed by the pressing platen. For example, to increase uniformity among products pressed together in a press cycle, the spacers can have different thicknesses that correspond with the location of the spacer in the pattern of dough balls.

The thermal conductivity of the spacers and the cover is optionally selected based on the processing temperature of the products. For example, the composition of the spacers can be selected so that the spacers efficiently transfer heat from the pressing platen to the cover.

In certain implementations, spacer thicknesses are determined based on the actual diameter of products currently being processed by the pressing platen. For example, a spacer adjustment module can compare the current product diameters and the variance from a desired product diameter with history data associated product diameters and variance with spacer adjustments. The spacer adjustment module can select process history information related to the product diameters and variance values and identify a spacer thickness recommendation based on the process history information.

The details of one or more implementations are set forth in the accompanying drawing and description below. Other features, objects, and advantages will be apparent from the description and drawings, and from the claims.

DESCRIPTION OF DRAWINGS

Like reference symbols in various drawing indicate like elements.

DETAILED DESCRIPTION OF ILLUSTRATIVE IMPLEMENTATIONS

Figure 1:
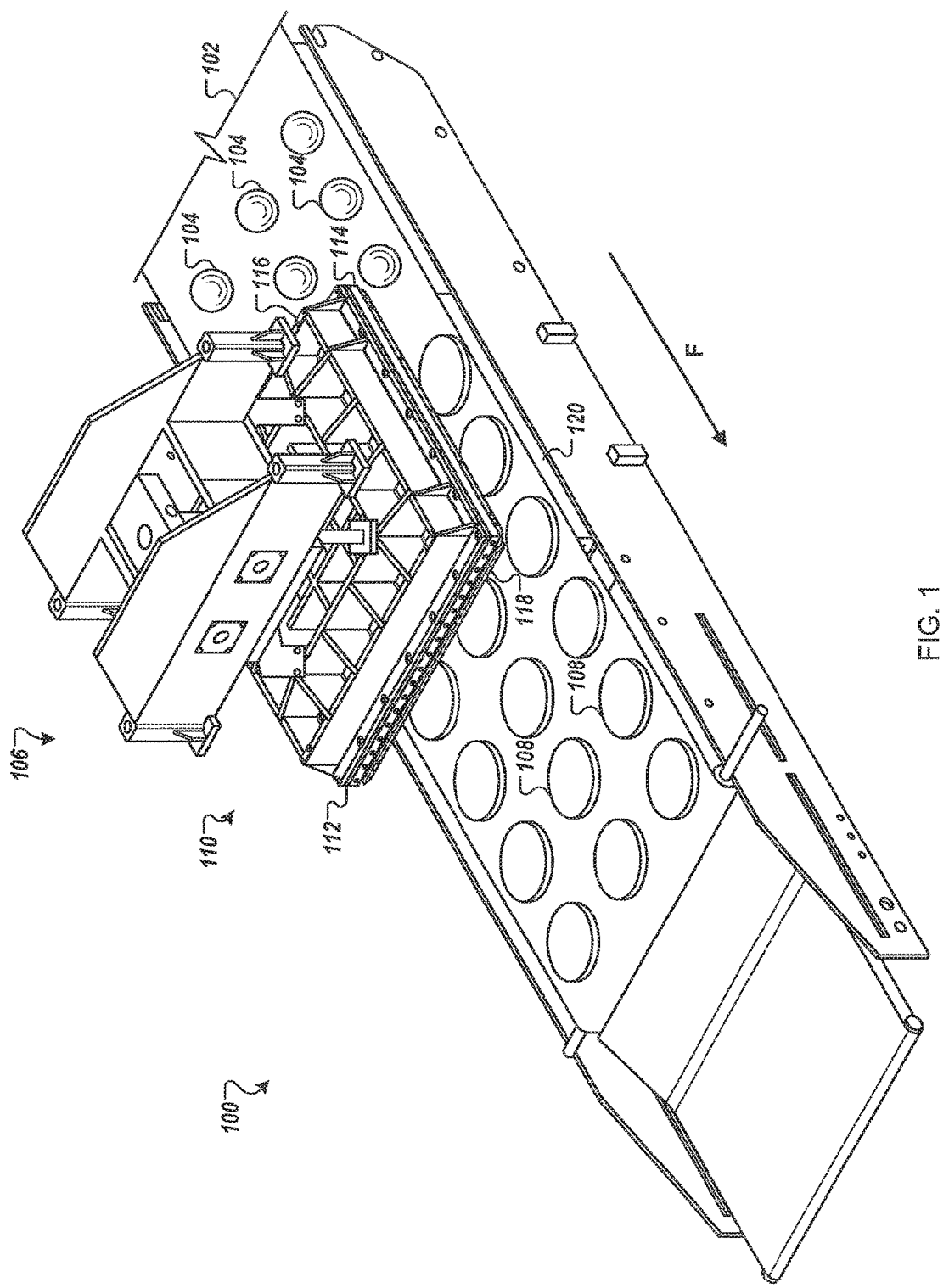
FIG. 1 is an example of a dough pressing apparatus.

During flattening of balls of dough, an upper pressing platen applies pressure against the top surfaces of the balls of dough while a lower pressing platen applies pressure on the balls of dough from below. The upper pressing platen includes a pressing plate and a skin covering the bottom surface of the pressing plate. The skin (or cover) contacts the upper surface of the balls of dough while heating the dough to form and maintain a flat circular shape.

One or more spacers are placed between the skin and the pressing plate to increase size uniformity (e.g., diameter and thickness) between all of the balls of dough being flattened at the same time (e.g., a pattern of dough balls or a press cycle) and between patterns of dough balls being processed during the same recipe run. The thermal conductivity of the spacers is selected so that heat from the pressing plate travels through the spacers and heats the skin so the balls of dough have the correct processing temperature.

If the diameter of a pressed ball of dough varies from a desired diameter by more than a threshold variance, the thickness of a spacer corresponding to the location the ball of dough was pressed at is adjusted so that the diameter of later balls of dough processed at the same location with respect to the pressing plate have a diameter within the threshold variance from the desired diameter.

The spacers have varying thicknesses corresponding to a spacing adjustment needed at a specific point between the pressing plate and the skin so that all the balls of dough in a press cycle have a size within the threshold variance. For example, one of the spacers can have a thickness of about 0.001 inches while another spacer contacting a different part of the skin has a thickness of about 0.385 inches.

A center vertical axis of the spacers aligns with a center vertical axis of a corresponding ball of dough before the ball of dough is flattened and during the pressing process. For example, the balls of dough are placed on a conveyor belt in specific positions so that the centers of the balls of dough will line up with the centers of the spacers when the conveyor moves the balls of dough below the upper platen. Sometimes, if the axes of a ball of dough and a corresponding spacer do not align, one side of the flattened dough extends past an edge of the spacer and the pressed ball of dough will have an irregular shape and/or the pressed ball of dough might be out of a diameter specification.

In certain implementations, for some of the locations in a pattern of dough balls, a spacer is not placed between the pressing plate and the skin. For example, if the size of a ball of dough is within the threshold size variance, a spacer is not required between the skin and pressing plate for that location in the pattern of dough balls.

A seal around the outer edge of the pressing plate allows the skin to be releasably attached to the pressing plate by vacuum suction. The vacuum suction permits the use of different thicknesses of spacers between the pressing plate and the skin while the skin remains in thermal contact with the pressing plate. For example, the skin stays in contact with either the spacers or the pressing plate and remains at an approximately uniform temperature during processing of the balls of dough.

When the balls of dough are pressed by the skin, the temperature of the skin, the spacers, and the upper pressing plate can decrease because of the heat conducted to the balls of dough. In some implementations, a thermocouple measures the temperature of the upper pressing plate and the temperature of heating coils in the upper pressing plate is adjusted based on the measured temperature of the upper pressing plate to keep the upper pressing plate at an approximately uniform temperature. In other implementations, a software module predicts temperature changes in the upper pressing plate, and the temperature of the heating coils is adjusted based on the predicted temperature.

Use of vacuum suction allows the skin to be easily removed from the pressing plate for maintenance and/or spacer adjustment. For example, if a non-stick coating on a bottom surface of the skin becomes worn, the vacuum pressure between the skin and pressing plate is removed so that a different skin can be placed on the bottom of the pressing plate.

In some implementations, thermal grease is applied to the spacers. The thermal grease helps hold the spacers in place with respect to the pressing plate and the skin and increases the transfer of heat between the pressing plate, and the skin.

FIG. 1 is an example of a dough pressing apparatus 100. The dough pressing apparatus 100 includes a conveyor 102 that receives one or more balls of dough 104. The balls of dough 104 are placed on the conveyor 102 by a loading station or another conveyor (not shown). The temperature of the conveyor 102 is the same as the ambient environment around the dough pressing apparatus 100.

The conveyor 102 moves a pattern of dough balls into a pressing station 106, which presses the balls of dough 104 and forms a plurality of pressed dough balls 108. The actual diameters of the pressed dough balls 108 are measured for accuracy to determine how close the diameters are to a desired diameter.

In some implementations, the pressure used at the pressing station 106 is adjusted based on the actual diameters of the pressed dough balls 108 if a number of the pressed dough balls 108 have a diameter that is smaller or larger than the desired diameter. For example, if there are nine balls of dough in a press cycle, and six of the pressed dough balls 108 have an actual diameter that is smaller than the desired diameter, the pressure used by the pressing station can be increased so that the diameters of the pressed dough balls 108 increases.

Figure 2A:
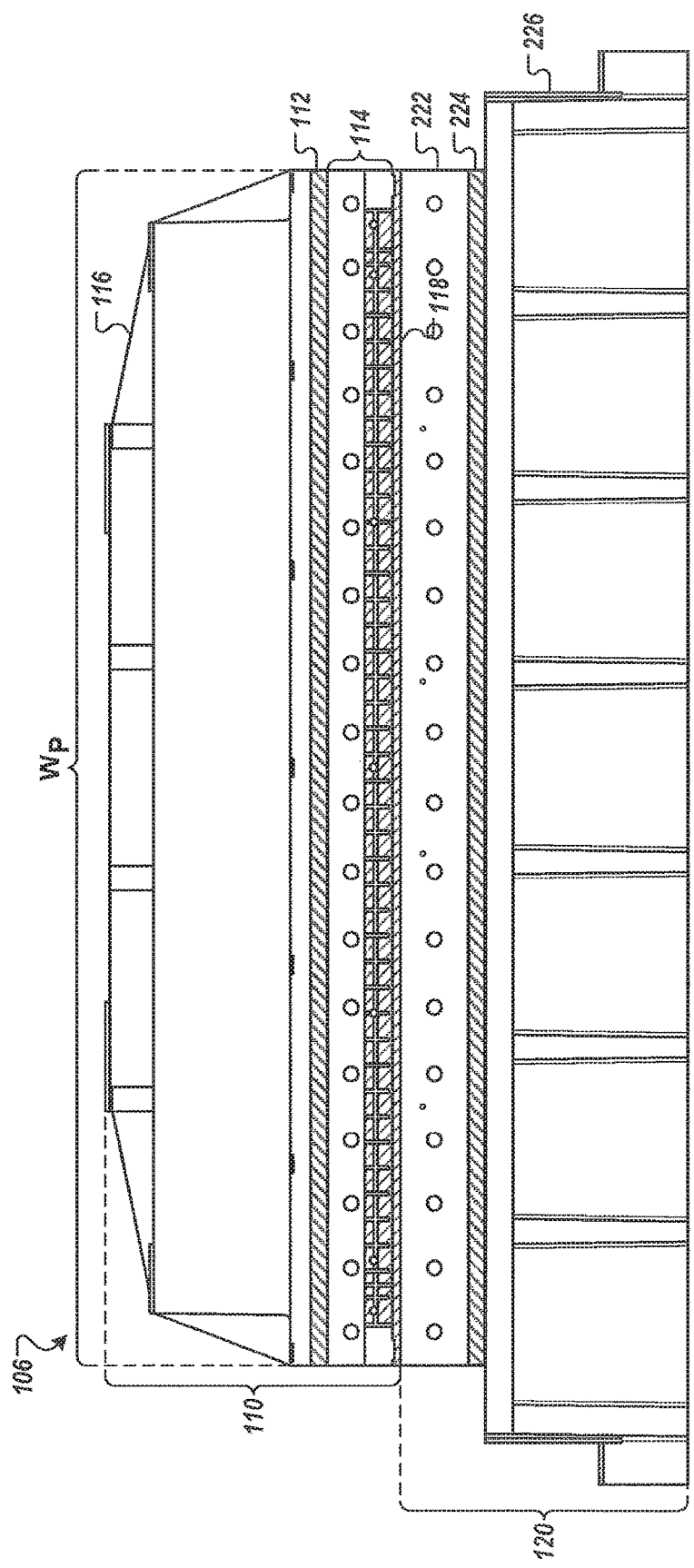
FIGS. 2A-B are an example of a pressing station.
Figure 2B:
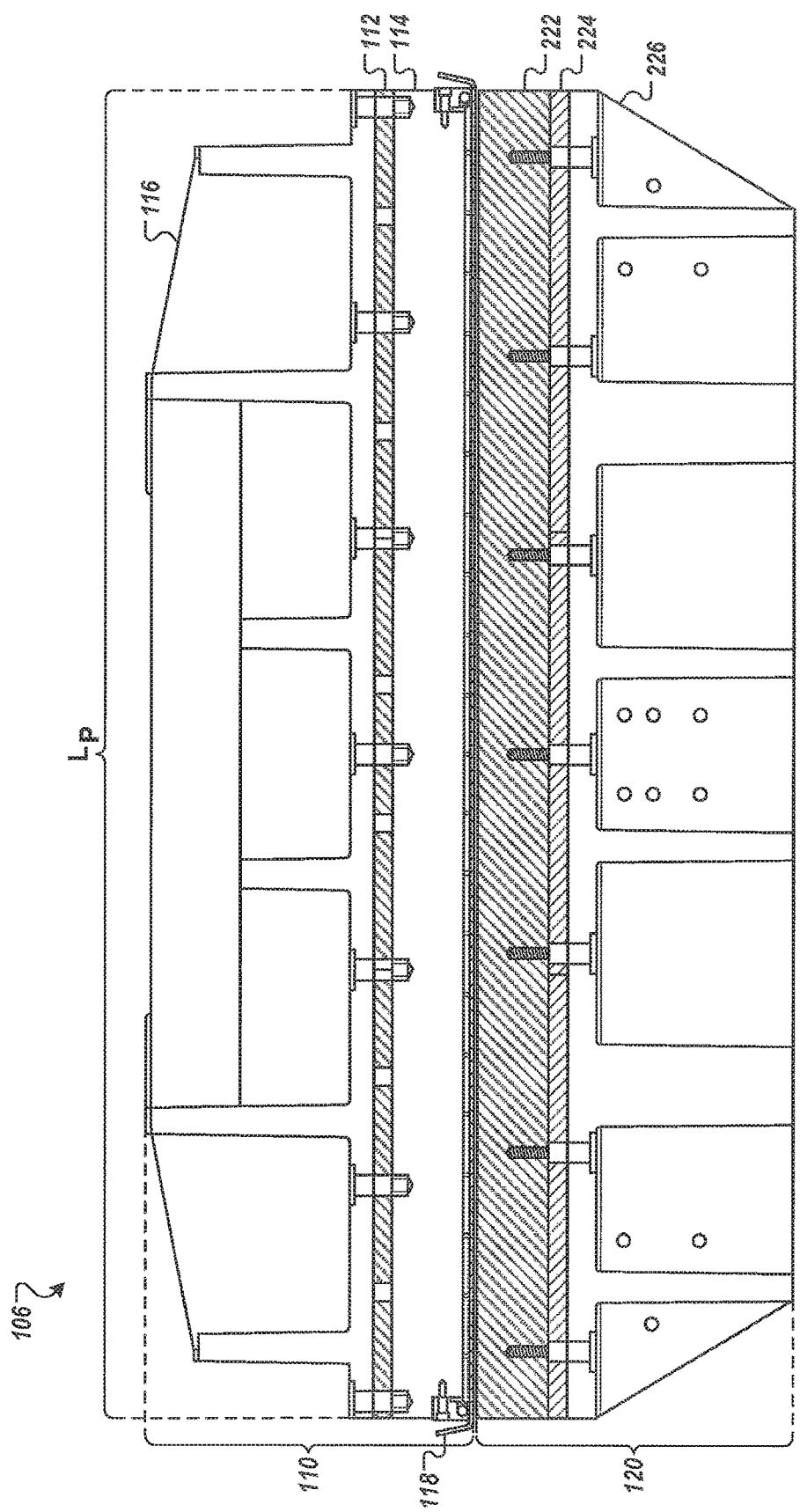

The pressing station 106 includes an upper pressing platen 110 that applies pressure to the balls of dough 104 from above, as shown in more detail in FIGS. 2A-B. The upper pressing platen 110 includes an upper insulator 112, an upper pressing plate 114, and an upper portion 116. The upper insulator 112 and the upper pressing plate 114 are mounted to the upper portion 116 with non-conductive bolts.

The upper insulator 112 provides thermal insulation so that heat from the upper pressing plate 114 does not pass into the upper portion 116 of the upper pressing platen 110. The upper insulator 112 is made from thermalate, such as Thermalate® H330 manufactured by Haysite. The upper insulator 112 has a maximum service temperature between about 500 and about 1000° F., preferably between about 500 to about 850° F., more preferably between about 550 to about 800° F. The upper insulator 112 has a compressive strength between about 17,000 to about 49,000 PSI, preferably between about 26,200 to about 49,000 PSI, more preferably between about 26,200 to about 44,000 PSI. In some implementations, the upper insulator 112 is composed of glastherm, such as Glastherm® HT or Cogetherm® manufactured by Glastic Corporation.

The upper insulator 112 and the upper pressing plate 114 are square with a length $L_P$ and a width $W_P$ between about 12 to about 72 inches, preferably between about 15 to about 60 inches. In certain implementations, the upper insulator 112 has a rectangular shape. In some implementations, the upper insulator 112 and the upper pressing plate are square with a width $W_P$ and length $L_P$ between about 37 to about 42 inches. The upper insulator 112 has a thickness between about ½ to about 2 inches, preferably between about ¾ to about 1¾ inches, more preferably about ¾ inches.

The upper pressing plate 114 includes one or more heating channels (not shown). The heating channels include one or more heating elements that increase the temperature of the upper pressing plate 114 during processing. In some implementations, a heating fluid, such as a liquid or a gas, flows through the heating channels in order to heat the upper pressing plate. For example, Argon gas passes through the heating channels and heats the upper pressing plate 114 to a temperature between about 150 to about 750° F., preferably between about 250 to about 550° F., more preferably between about 300 to about 400° F.

The thickness of the upper pressing plate 114 is selected based on the pressure applied to the balls of dough 104 and the temperature required to heat the balls of dough during processing. For example, the upper pressing plate 114 has a thickness between about 1 to about 5 inches, preferably between about 1½ to about 3 inches. For example, the finished thickness of the upper pressing plate 114 can be about 2.974 inches.

In some implementations, the thickness of the upper pressing plate 114 is selected based on the composition of the upper pressing plate 114. For example, when the upper pressing plate 114 is made from graphene, the upper pressing plate 114 has a lesser thickness than if the upper pressing plate 114 was made from gold.

The upper pressing plate 114 is made from a material with a high thermal conductivity. The upper pressing plate 114 has a thermal conductivity between about 5 to about 5500 W/(m*K), preferably between about 15 to about 2500 W/(m*K), more preferably between about 30 to about 500 W/(m*K).

In some implementations, the composition of the upper pressing plate 114 is selected based on the resistance of the material to wear or scratches. For example, stainless steel is used to increase hardness (e.g., durability) and corrosion resistance of the upper pressing plate 114. The increased hardness of stainless steel decreases scratches and dents made to the upper pressing plate 114.

In some implementations, the upper pressing plate 114 is manufactured from aluminum or an aluminum alloy in order to have high wear resistance, a light mass, and a reduced heating time (e.g., based on a thermal conductivity of about 120 to about 237 W/(m*K)). The upper pressing plate 114 can be made from ceramic material in order to withstand high processing temperatures without deforming (e.g., up to about 3,000° F.) and have a high wear resistance. Brass can be used for the upper pressing plate 114 based on the low friction of brass materials and good thermal conductivity (e.g., about 109 W/(m*K)).

In certain implementations, the upper pressing plate 114 is manufactured from diamonds and has an increased durability and a high thermal conductivity (e.g., between about 900 to about 2,320 W/(m*K)). Similarly, the upper pressing plate 114 can be composed of graphene to have a high durability and thermal conductivity (e.g., between about 4,840 to about 5,300 W/(m*K)). Copper or a copper alloy can be used for the upper pressing plate 114 for good thermal conductivity (e.g., about 401 W/(m*K)). Alternatively, silver, with a high thermal conductivity (e.g., about 429 W/(m*K)), can be used for the composition of the upper pressing plate 114. In some implementations, the upper pressing plate 114 is made from gold based on the thermal conductivity of gold (e.g., about 318 W/(m*K)). In some implementations, lead, with a thermal conductivity of about 35.3 W/(m*K) can be included in the composition of the upper pressing plate 114.

The upper pressing platen 110 includes a skin 118 that protects the bottom surface of the upper pressing plate 114 from wear caused by heat and/or pressure during processing of the balls of dough 104. For example, a pressure between about 3 to about 70 PSI is applied to the upper pressing platen 110 to press a bottom surface of the skin 118 against the balls of dough 104, preferably between about 5 to about 65 PSI. In some implementations, a pressure between about 9 to about 50 PSI is applied to the upper pressing platen 110.

The pressing station 106 uses different pressures based on the desired diameter of the pressed dough balls 108. For example, a higher pressure (e.g., 48 PSI) is used to create pressed dough balls with a larger diameter (e.g., 12 inches) and a lower pressure (e.g., 13 PSI) is used to create pressed dough balls with a smaller diameter (e.g., 5 inches).

The diameter of the pressed dough balls 108 is inversely proportional to the thickness of the pressed dough balls 108. For example, increasing the diameter of a specific pressed dough ball decreases the thickness of the specific pressed dough ball. In one example, a ball of dough with a specific volume has a diameter of 10 inches and a thickness of ¼ inches, and a ball of dough with the same volume and an 8 inch diameter has a thickness of 25/64 inches.

The pressing station 106 includes a lower pressing platen 120. The lower pressing platen 120 applies pressure to the balls of dough 104 from below during processing. For example, the lower pressing platen 120 supports the balls of dough 104 on the conveyor 102 while the upper pressing platen 110 presses down on the top surface of the balls of dough 104.

The lower pressing platen 120 includes a lower pressing plate 222 and a lower insulator 224. The lower pressing plate 222 has a similar configuration (e.g., size and composition) to that of the upper pressing plate 114. For example, the lower pressing plate 222 is heated and has a thermal conductivity of between about 5 to about 5500 W/(m*K), preferably between about 15 to about 2500 W/(m*K), more preferably between about 30 to about 500 W/(m*K).

In some implementations, the lower pressing plate 222 has a lower temperature than the upper pressing plate 114 in order to reduce the likelihood that a ball of dough will stick to the skin 118 after being pressed. For example, the pressed dough balls are more likely to stick to a cooler surface, so the temperature of the lower pressing plate 222 is less than the temperature of the upper pressing plate 114 and the skin 118 so that the pressed dough balls 108 will rest on the conveyor 102 after processing instead of sticking to the skin 118 and lifting off of the conveyor 102.

For example, the lower pressing plate 222 has a temperature between about 150 to about 750° F., preferably between about 250 to about 550° F., more preferably between about 300 to about 400° F. In one example, when the upper pressing plate 114 has a temperature of around 350° F., the skin 118 has a temperature of around 340° F., and the lower pressing plate 222 has a temperature of around 325° F.

The lower pressing plate 222 optionally has a different size or composition than the upper pressing plate 114. For example, the lower pressing plate 222 is manufactured from stainless steel, which has a higher resistance to wear, and the upper pressing plate 114 is manufactured from aluminum, which has a lower mass and is easier to lift. In another example, the lower pressing plate 222 is 3 inches thick and the upper pressing plate 114 has a finished thickness of 2.974 inches thick.

The lower insulator 224 prevents the lower pressing plate 222 from heating a lower portion 226 of the lower pressing platen 120. The lower insulator 224 has is composed of thermalate, such as Thermalate® H330 manufactured by Haysite. The lower insulator has a thickness between about ½ to about 2 inches, preferably between about ¾ to about 1¾ inches. In some implementations, the lower Insulator 224 is made from glastherm, such as Glastherm® HT or Cogetherm® manufactured by Glastic Corporation.

Figure 3A:
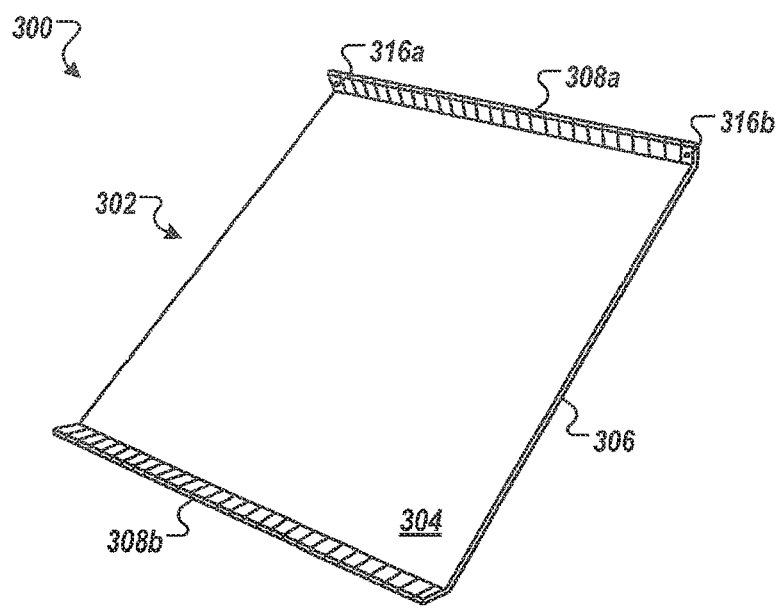
FIG. 3A-C illustrate an example of a skin.
Figure 3B:
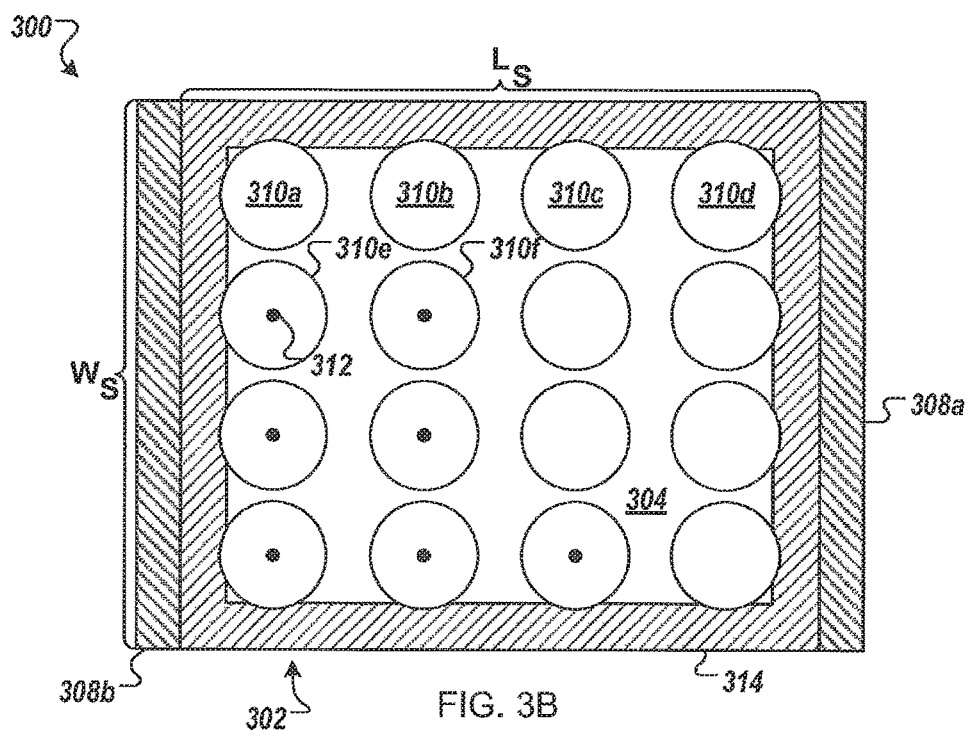
Figure 3C:
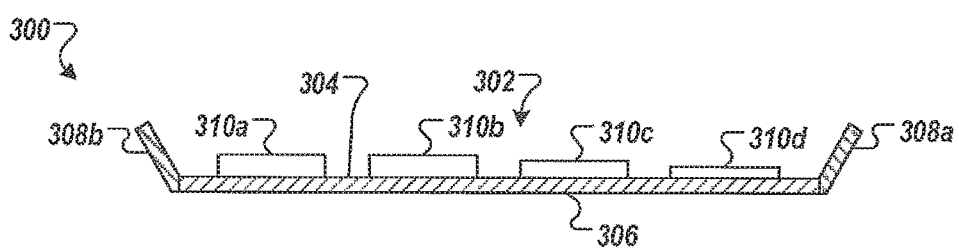

FIGS. 3A-C illustrate an example of a skin 300. For example, the skin 300 is the same as the skin 118 used in the upper pressing platen 110. The skin 300 includes a substantially flat center portion 302. An upper surface 304 of the center portion 302 abuts a bottom surface of the upper pressing plate 114 when the skin 300 is attached to the upper pressing plate 114 and a lower surface 306 of the center portion 302 applies pressure against the balls of dough 104 during processing.

The skin 300 includes two lip portions 308a-b that extend from the latitudinal ends of the skin 300. Each of the lip portions 308a-b extends upward from the center portion 302. The lip portions 308a-b extend next to the latitudinal sides of the upper pressing plate 114 when the skin 300 is attached to the upper pressing plate 114, as described in more detail below.

The width $W_S$ of the skin 300 is the same as the width $W_P$ of the upper pressing plate 114. For example, if the width $W_P$ of the upper pressing plate 114 is 42 inches, the width $W_S$ of the skin 300 is 42 inches. The length $L_S$ of the skin 300 is about the same as the length $L_P$ of the upper pressing plate 114. For example, if the length $L_P$ of the upper pressing plate 114 is 42 inches, the length $L_S$ of the skin 300 is between about 42 to about 43 inches, preferably between about 42¼ to about 42½ inches, more preferably about 42¼ inches. The length $L_S$ of the skin 300 is selected so that the lip portions 308a-b extend upward past the latitudinal sides of the upper pressing plate 114 when the skin 300 is attached to the upper pressing plate 114.

In other implementations, the skin 300 is smaller than the upper pressing plate 114. For example, the size of the skin 300 is selected based on the pattern of dough balls being processed by a dough pressing apparatus. The size is large enough to prevent contact between the pressed dough balls and the upper pressing plate 114. The smaller size of the skin 300 in this embodiment reduces the amount of vacuum pressure needed to hold the skin 300 adjacent to the upper pressing plate 114.

In some implementations, the skin 300 has only one lip portion (e.g., the lip portion 308a). For example, the lip portion 308a is used to align the skin 300 with the upper pressing plate 114 and as part of a safety system, described in more detail below.

In certain implementations, the skin 300 does not include either of the lip portions 308a-b. For example, having a symmetrical shape can increase heat uniformity across the skin 300.

The skin 300 has a thickness between about 0.03125 to about 2 inches, preferably between about 0.0625 to about 1½ inches, more preferably between about 0.080 to about 1 inch. For example, the thickness of the skin 300 is selected to reduce the chance of dents, bends, and/or tears occurring in the skin 300.

The skin 300 has a processing temperature of between about 150 to about 750° F., preferably between about 250 to about 550° F., more preferably between about 300 to about 400° F. Heat is conducted to the skin 300 from the upper pressing plate 114 and used to during processing of the balls of dough 104. For example, the contact between the upper surface 304 and the upper pressing plate 114 conducts heat from the upper pressing plate 114 and into the skin 300.

One or more spacers 310a-f, shown in FIG. 3B, are placed on the skin 300 between the upper surface 304 and a bottom surface of the upper pressing plate 114. Each of the spacers 310a-f includes one or more thermally conductive shims. For example, the spacer 310e includes two shims, a first with a thickness of 0.025 inches and a second with a thickness of 0.2 inches, and the spacer 310d includes one shim with a thickness of 0.03 inches. Each of the shims has a thickness between about 0.001 to about 0.5 inches, preferably between about 0.001 to about 0.25 inches, more preferably between about 0.001 to about 0.1 inches.

In some implementations, the spacers 310a-f introduce slight gaps between the skin 300 and the upper pressing plate 114. For example, there can be a small gap between the upper surface 304 and the upper pressing plate 114 around the circumference of each of the spacers 310a-f. In certain implementations, the size of the gap is small such that the gap does not introduce cool spots on the skin 300 that affect processing of the balls of dough 104.

In other implementations, the location of the gap is outside of an area that touches the balls of dough 104 during processing. For example, each of the spacers 310a-f has a larger diameter than the desired diameter of the pressed dough balls 108 and any cool spots on the skin 300 caused by the gap do not negatively affect processing.

Each of the shims has a circular shape that corresponds with the shape of the balls of dough 104. In some implementations, the shims are square or rectangular with a size greater than a desired diameter of the pressed dough balls 108. Square shims are used, for example, based on the ease of manufacturing square shims from sheet material (e.g., it is easier to cut square shims from sheet material than circular shims).

The size of the shims is selected based on the desired diameter of the pressed dough balls 108. The shims have a size that is between about 10 to about 150% of the desired diameter, preferably between about 30 to about 150%, more preferably between about 50 to about 150%. For example, when the desired diameter of the pressed dough balls 108 is 10 inches, each of the shims has a diameter of 12 inches (e.g., 120% the size of the desired diameter).

The diameter of the shims is larger than the desired diameter of the pressed dough balls 108 because the diameter of the pressed dough balls 108 decreases with decreasing platen pressure. For example, a shim with a 12 inch diameter applies pressure on a ball of dough through the skin 300, forming a pressed dough ball with an 11 inch diameter. When the skin 300 is retracted, the pressed dough ball tends to return to its original shape (e.g., the shape before processing) and the diameter of the pressed dough ball decreases to about 10 inches.

In some implementations, changes in the duration of the pressing cycle affect the actual diameter of a pressed dough ball. For example, when pressure is applied to a pressed dough ball for a longer period of time, the diameter of the dough ball changes less than when pressure is applied for a shorter period of time.

In one example, the shims have a larger diameter than the desired diameter so that the pressed dough balls 108 are heated evenly during processing.

In another example, the diameter of each of the shims is less than the desired diameter of the pressed dough balls 108. For example, when the desired thickness of the pressed dough balls 108 is thin (e.g., between about 1.5 to about 3 mm), the pressure and heat of the pressing station 106 sometimes causes cracks to form near the edges of the pressed dough balls 108.

In this example, the heating that helps the pressed dough balls 108 maintain their shape and reduces the moisture in the pressed dough balls 108, can cause cracks to form. Using shims that are smaller than the desired diameter of the pressed dough balls 108 creates a thicker edge around the circumference of the pressed dough balls 108 because a reduced amount of pressure is applied to the dough that extends beyond the edges of the shims.

The thicker edge around the circumference has a reduced possibility of cracking because of the additional thickness of the dough. Less heat is transferred to the thicker edge because of reduced contact between the shims and the thicker edge, which causes less moisture to be removed from the thicker edge and reduces the possibility of cracks forming in the thicker edge. For example, a gap around the circumference of the shims can cause the surface of the skin 300 to be slightly cooler around the circumference of the shims so that less moisture is removed from the portion of the pressed dough ball that corresponds with the gap around the circumference of the shims.

In order for the thicker edge of the dough to be uniform, the balls of dough 104 need to align with the spacers 310a-f. For example, a central vertical axis 312 of the spacer 310e needs to be aligned as closely as possible with a central vertical axis of the ball of dough that will be pressed by the bottom surface of the skin 300 below the spacer 310e.

For example, when the balls of dough 104 are placed on the conveyor 102, as shown in FIG. 1, each of the balls of dough 104 in a press cycle are spaced evenly apart and the conveyor moves the pattern of dough balls in a forward direction F to place the pattern of dough balls in the pressing station 106. When the balls of dough 104 are in the pressing station 106, center vertical axes 402a-d of the balls of dough 104, shown in FIG. 4A, align with a central vertical axis of a corresponding spacer 310a-d.

Figure 4A:
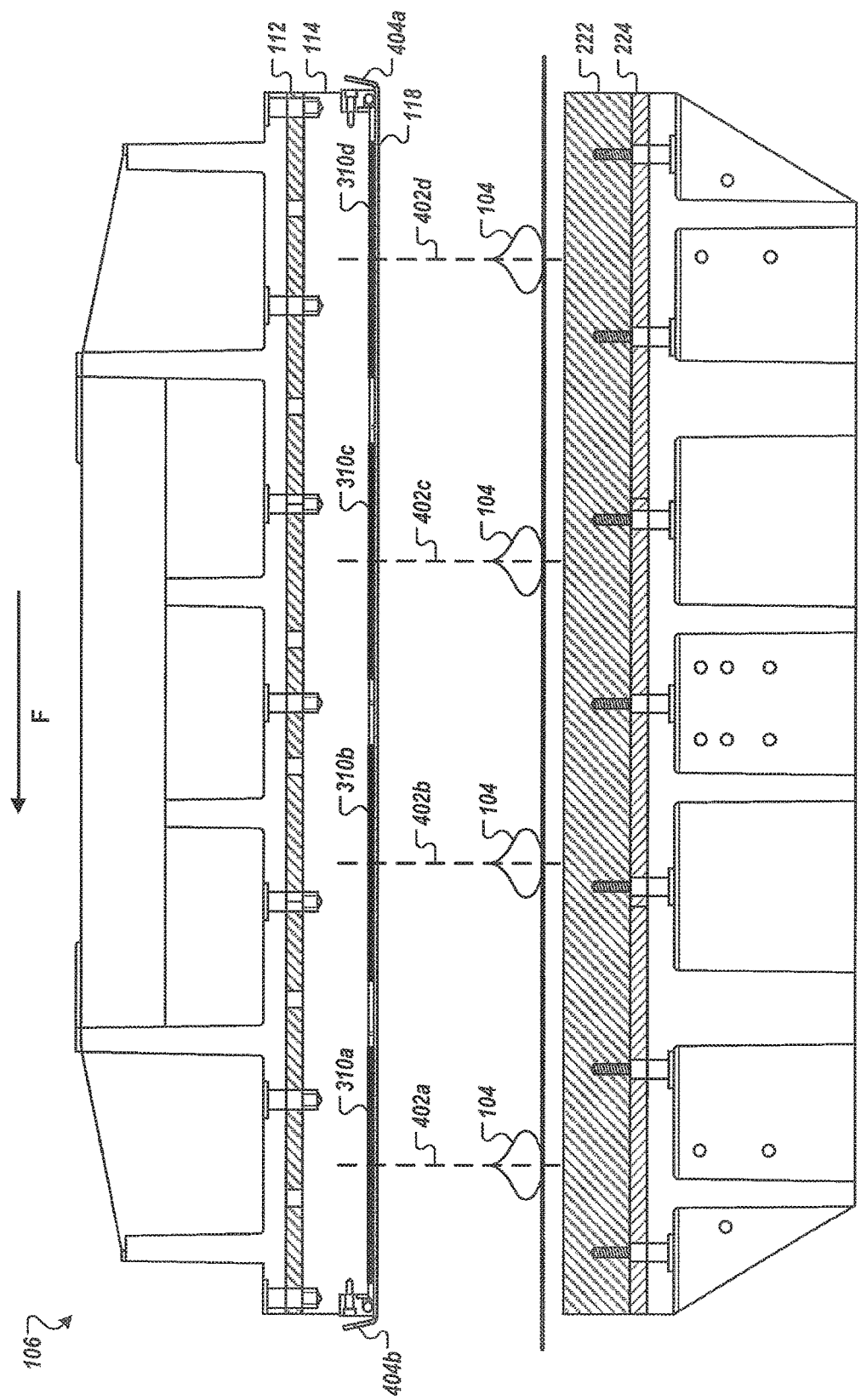
FIGS. 4A-B illustrate an example of a skin mounted to a pressing plate.
Figure 4B:
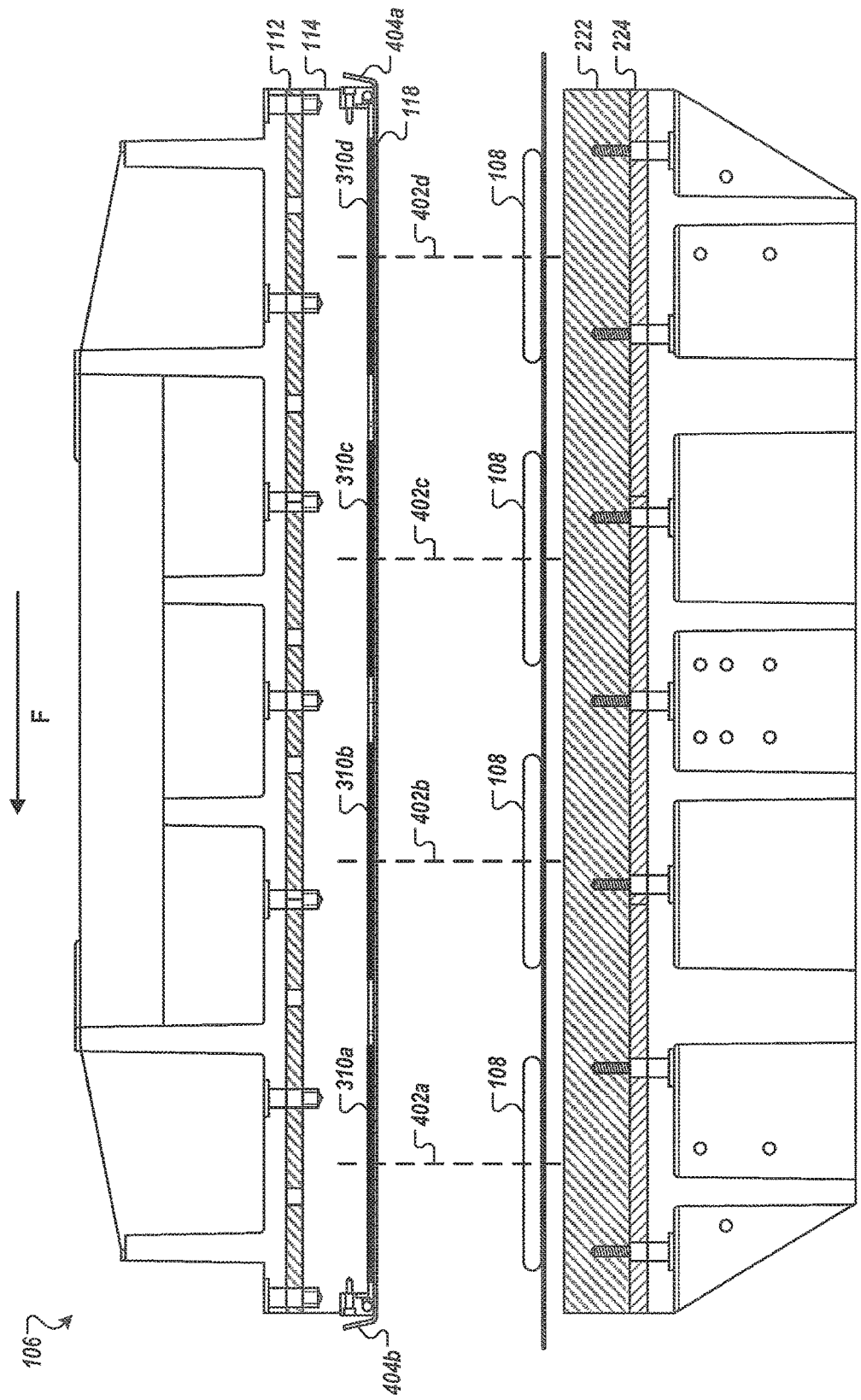

When the upper pressing platen 110 presses down on the balls of dough 104 in the press cycle, the centers of the spacers 310a-d apply pressure to the centers of the balls of dough and the pressed dough balls 108 are formed, as shown in FIG. 4B.

When the spacers 310a-f have a smaller diameter than the desired diameter of the pressed dough balls, each of the pressed dough balls has an edge that is thicker than the center of the pressed dough ball and the width of the thicker edge is within a threshold variance based on the alignment of the center vertical axes of the balls of dough and the spacers 310a-f. For example, the width of the thicker edge is almost uniform around the circumference of the pressed dough balls 108.

In some implementations, some of the spacers 310a-f have different thickness, as shown in FIG. 3C. When some of the pressed dough balls 108 have different diameters, the thickness of the spacers 310a-f can be adjusted to reduce the variance between the diameters of the pressed dough balls 108.

For example, when the desired diameter of the pressed dough balls is 10 inches and a pressed dough ball corresponding with the spacer 310b has an actual diameter of 9.7 inches and a pressed dough ball corresponding with the spacer 310d has an actual diameter of 10.4 inches, the thickness of the spacers 310b and 310d can be adjusted so that future pressed dough balls have a diameter closer to 10 inches. The thickness of the spacer 310b, for example, is increased in order to increase the diameter of corresponding pressed dough balls and the thickness of the spacer 310d is decreased in order to decrease the diameter of the dough balls pressed by the spacer 310d.

In certain implementations, when the diameter of the spacers 310a-f are larger than the desired diameter of the pressed dough balls 108, a spacer is not placed at every potential spacer position on the skin 300. For example, if the average thickness of pressed dough balls corresponding with the spacer 310b is about 10.1 inches when the spacer is 0.001 inches thick, the spacer 310b can be removed from between the skin 300 and the upper pressing plate 114 so that the average thickness of the dough balls corresponding to the former location of the spacer 310b is closer to the desired diameter of 10 inches.

In other implementations, when the diameter of the spacers 310a-f are smaller than the desired diameter of the pressed dough balls 108, a spacer is required in every potential spacer location on the skin. For example, each of the pressed dough balls 108 has an edge that is thicker than the center of the pressed dough ball. In order to create the thicker edge, at least one shim is needed for each spacer location so that more pressure is applied to the center of the dough balls making the center of the pressed dough balls thinner than the outer edge.

When the spacers 310a-f are shims, thermal grease is applied between the shims and both the skin 300 and the upper pressing plate 114 to increase the thermal conductivity between the upper pressing plate 114, the shims, and the skin 300. The thermal grease has a thermal conductivity of between about 10 to about 250 W/(m*K). Alternatively, the thermal conductivity is between about 50 to about 300 W/(m*K). In some implementations, the thermal conductivity of the thermal grease is selected to be between about 30 and about 500 W/(m*K) based on the properties of the skin 300, the shims, and/or the upper pressing plate 114.

The thermal conductivity of the skin 300 and the spacers 310a-f is between about 5 to about 5500 W/(m*K), preferably between about 25 to about 3000 W/(m*K), more preferably between about 30 to about 500 W/(m*K). For example, the skin 300 and the spacers 310a-f are made from aluminum or an aluminum alloy with a thermal conductivity between about 120 to about 237 W/(m*K). In some implementations, the skin 300 and the spacers 310a-f have different properties, such as different thermal conductivities.

When the skin 300 is made from diamonds, the skin 300 has a high hardness (e.g., reduced wear during use) and high thermal conductivity (e.g., about 900 to about 2,320 W/(m*K)). The high hardness of diamond compositions needs to be considered when forming the skin 300 from diamonds. Alternatively, the skin 300 and/or the spacers 310a-f can be composed of graphene to have a high durability and thermal conductivity (e.g., about 4,840 to about 5,300 W/(m*K)). When the skin 300 is made from gold, the pressure used during processing needs to be adjusted based on the softness of gold. In some implementations, the spacers 310a-f are made from silver because of the high thermal conductivity of silver (e.g., about 429 W/(m*K)). When additional pressure can be applied to the skin 300 to support the skin 300 and the spacers 310a-f adjacent to the upper pressing plate 114, the skin 300 and/or the spacers 310a-f can be made from stainless steel for the thermal conductivity (e.g., between about 12.11 to about 45.0 W/(m*K)) and durability of stainless steel. In certain implementations, the spacers 310a-f can be manufactured from brass for the low friction and good thermal conductivity of brass (e.g., about 109 W/(m*K)). The skin 300 can be composed of the same material as the spacers 310a-f or of a different material.

The surface finish of the upper surface 304 of the skin 300, the upper and lower surfaces of the spacers 310a-f, and the bottom surface of the upper pressing plate 114 is selected to increase thermal conductivity. For example, the skin 300 and the spacers 310a-f have a surface finish between about 50 to about 500 Ra μm, preferably between about 75 to about 400 Ra μm, more preferably between about 100 to about 250 Ra μm.

The surface finish of the lower surface 306 of the skin 300 is chosen based on the desired heat transfer between the skin 300 and the balls of dough 104 and the desired (e.g., low)

coefficient of static friction between the skin 300 and the balls of dough 104 (e.g., so that the pressed dough balls 108 do not stick to the skin 300).

In some implementations, the lower surface 306, the lip portions 308a-b, and/or an outer perimeter 314 of the upper surface 304 are coated with a non-stick material (e.g., a release agent). Non-stick materials applied to the lower surface 306 or the outer perimeter 314 have a thermal conductivity between about 10 to about 500 W/(m*K), preferably between about 15 to about 450 W/(m*K), more preferably between about 30 to about 300 W/(m*K), to transfer heat to the balls of dough 104 during processing. The non-stick material has a maximum use temperature between about 350 to about 1000° F., preferably between about 400 to about 800° F., more preferably between about 450 to about 750° F. In other implementations, the non-stick material has a maximum temperature between about 350 to about 650° F., preferably between about 400 to about 600° F., more preferably between about 450 to about 550° F.

For example, the lower surface 306 is coated with Teflon (e.g., Teflon 532-13054) so that the balls of dough 104 do not stick to the lower surface 306 during processing. In certain implementations, grease or oil is applied to the lower surface 306 periodically during processing of the balls of dough 104 to reduce static friction between the skin 300 and the balls of dough 104. Sometimes, when the balls of dough include a threshold percentage of oil, the lower surface 306 of the skin 300 does not need a non-stick coating.

As shown in FIGS. 4A-B, two lip portions 404a-b extend upward from the skin 118 adjacent to the latitudinal sides of the upper pressing plate 114 when the skin 118 is attached to the upper pressing plate 114. The two lip portions 404a-b are used to align the skin 118 with the upper pressing plate 114 when the skin 118 is being attached to the upper pressing plate 114.

In certain implementations, one of the lip portions (e.g., the lip potion 404a) includes an identifier that is used to align the skin 118 with the upper pressing plate 114. For example, the lip portion 308a, shown in FIG. 3A, includes two apertures 316a-b that distinguish the lip portion 308a from the lip portion 308b. When the skin 300 is attached to the upper pressing plate 114, the apertures 316a-b are used to determine which end of the skin 300 to align with the latitudinal end of the upper pressing plate 114 that the balls of dough 104 initially pass under when moving in the forward direction F.

In some implementations, the temperatures of the upper pressing plate 114, the skin 118, and the spacers 310a-d decrease when the upper platen 110 is pressed the balls of dough 104. For example, the skin 118 transfers heat to the pressed dough balls 108 and the temperatures of the upper pressing plate 114, the spacers 310a-d, and the skin 118 decrease. A thermocouple (not shown) measures the temperature of the upper pressing plate 114 and increases the temperature of the heating coils in the upper pressing plate 114 to keep the upper pressing plate 114, the spacers 310a-d, and the skin 118 at an approximately uniform temperature during processing. In other implementations, a software module predicts temperature changes in the upper pressing plate 114, and the temperature of the heating coils is adjusted based on the predicted temperature.

Figure 5A:
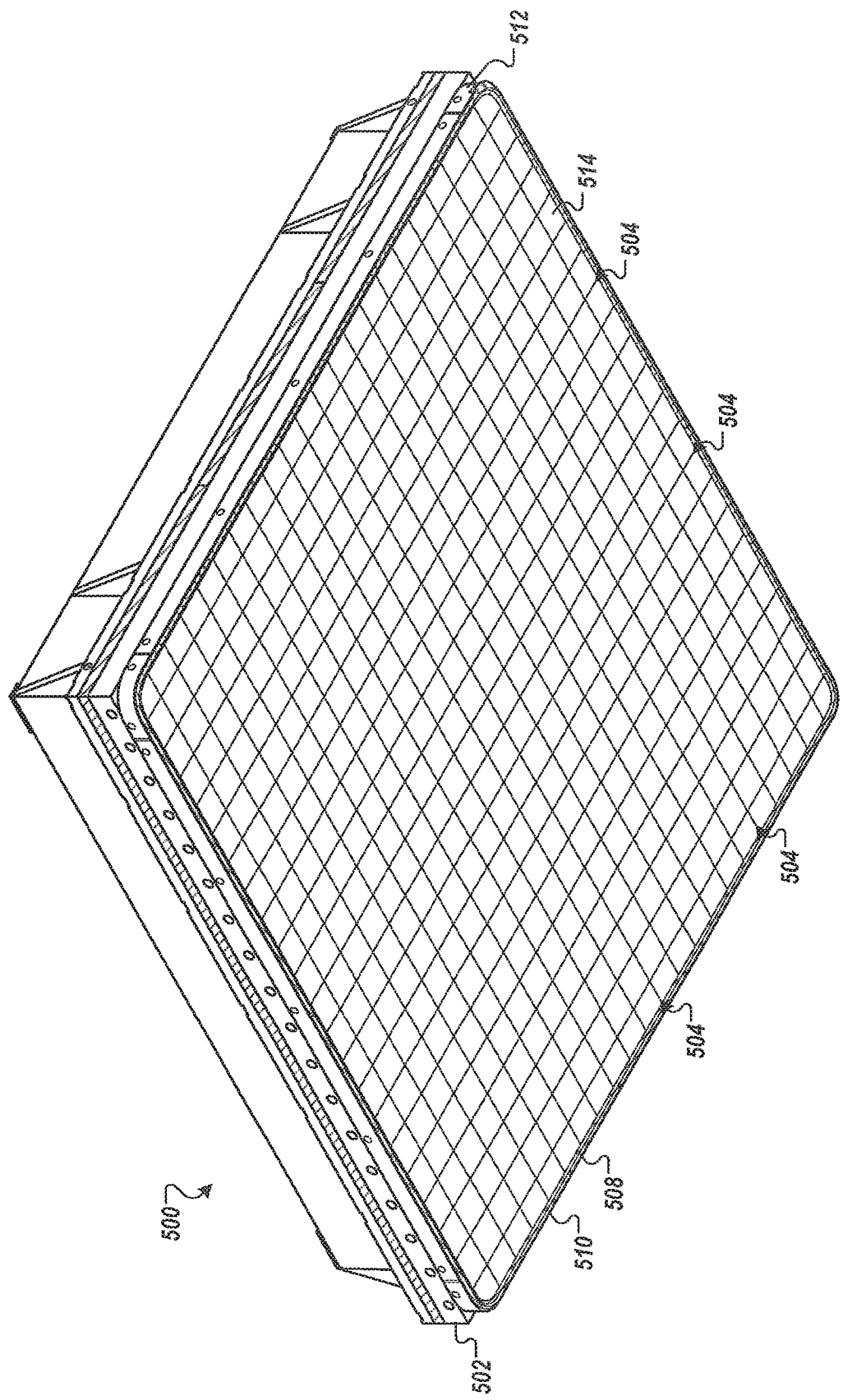
FIGS. 5A-C illustrate an example of vacuum grooves in an upper platen.
Figure 5B:
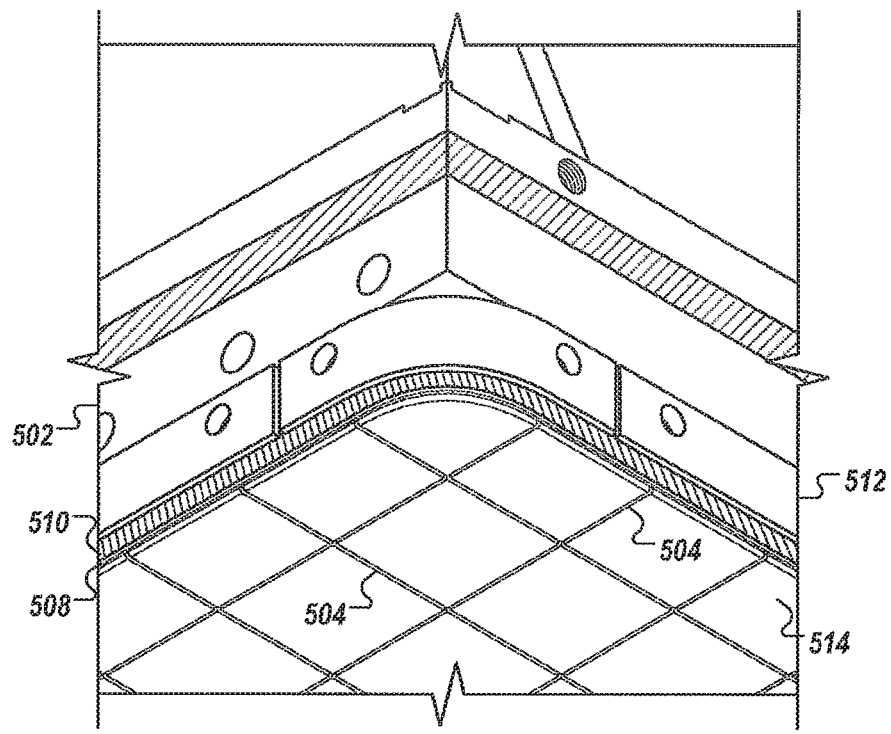
Figure 5C:
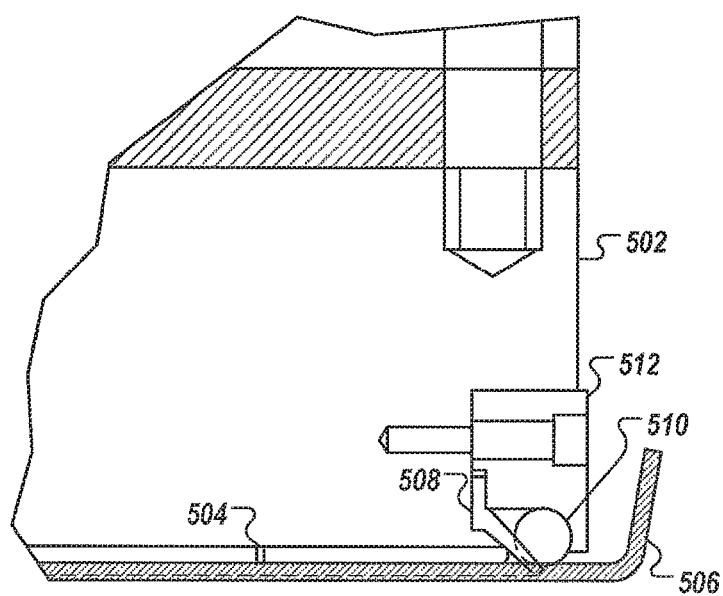

FIGS. 5A-C illustrate an example of vacuum grooves in an upper platen 500. The upper platen 500 includes an upper pressing plate 502 with a plurality of grooves 504 in a bottom surface 514 of the upper pressing plate 502. When the bottom surface 514 of the upper pressing plate 502 contacts a skin 506, shown in FIG. 5C, a vacuum pump (not shown) connected to the grooves 504 creates vacuum pressure between the upper pressing plate 502 and the skin 506 and the vacuum pressure holds the skin 506 against the bottom surface 514 of the upper pressing plate 502.

A seal 508, located around a peripheral edge of the upper pressing plate 502 as shown in FIGS. 5A-B, facilitates the creation of the vacuum pressure that holds the skin 506 in place against the bottom surface 514. When the upper pressing plate 502 initially contacts the skin 506 an inflatable tube 510, located adjacent to the seal 508, is pneumatically filled with air, causing the seal 508 to move downward and contact the skin 506. Once the seal 508 contacts the skin 506 a vacuum seal can be made between the upper pressing plate 502 and the skin 506 using the seal 500.

The upper pressing plate 502 includes a flange 512 around the bottom circumference of the upper pressing plate 502, which holds the seal 508 and the inflatable tube 510 in place. The flange 512 is attached to the upper pressing plate 502 with a plurality of bolts. For example, the flange 512 is made of multiple pieces, and each of the pieces is connected to the upper pressing plate 502 with two or more bolts.

In some implementations, the skin 506 includes a coating that helps separate the skin 506 from the seal 508 when the vacuum pressure between the skin 508 and the upper pressing plate 502 is removed. For example, an outer perimeter (e.g., the outer perimeter 314) on the upper surface of the skin 506 is coated with a non-stick material (e.g., Teflon) so that a vacuum seal is more easily created between the skin 506 and the seal 508. The non-stick material has a maximum use temperature between about 350 to about 1000° F., preferably between about 400 to about 800° F., more preferably between about 450 to about 750° F. In other implementations, the non-stick material has a maximum temperature between about 350 to about 650° F., preferably between about 400 to about 600° F., more preferably between about 450 to about 550° F.

A vacuum seal between the skin 506 and the upper pressing plate 502 is created to hold the skin 506 in place against the entire bottom surface 514 and to prevent the skin 506 from warping during processing of balls of dough. If the skin 506 is allowed to warp, cool spots can be formed on the skin 506 that affect the uniformity of balls of dough processed at a pressing station.

The vacuum pressure between the upper pressing plate 502 and the skin 506 is between about 2 to about 15 PSI, preferably between about 4 to about 15 PSI, more preferably between about 4 to about 14.7 PSI. In some implementations, the pressure used to create vacuum suction varies based on the weight of the skin 506 and spacers placed between the skin 506 and the upper pressing plate 502.

The seal 508 and the inflatable tube 510 are made from silicone. In some implementations, the seal 508 and/or the inflatable tube 510 are manufactured from an elastomer that can withstand maximum processing temperatures between about 500 to about 650° F. without deforming. The hardness of the seal 508 and/or the inflatable tube 510 is between about 15 to about 100 Durometer, preferably between about 25 to about 80 Durometer, for A or D type testing according to ASTM D2240 testing for softer or harder plastics.

The tensile strength of the seal 508 and/or the inflatable tube 510 is between about 600 to about 1500 PSI, preferably between about 700 to about 1300 PSI. The elongation of the seal 508 is between about 400 and about 650%, preferably between about 500 and 600%. The elongation of the inflatable tube 510 is between about 200 to about 400%, preferably between about 250 and about 350%.

The inner diameter of the inflatable tube 510 is between about ⅛ to about 1 inch. The inner diameter is selected so that the inflatable tube 510 presses downward on the seal 508 when the inflatable tube 510 is filled with air and the seal 508 can help create a vacuum seal between the upper pressing plate 502 and the skin 506. The outer diameter of the inflatable tube 510 is between about 5/32 to about ⅝ inches. The outer diameter of the inflatable tube 510 is selected based on the inner diameter of the inflatable tube 510 and the desired flexibility of the inflatable tube. The outer diameter is selected so that the inflatable tube 510, when deflated, does not press downward on the seal 508 and the vacuum seal between the upper pressing plate 502 and the skin 506 can be removed when processing of the balls of dough is completed (e.g., to allow maintenance of the skin 506).

In some implementations, when shims are placed between the skin 506 and the upper pressing plate 502, the shims are perforated to enhance suction between the upper pressing plate 502 and the skin 506. For example, less pressure is required to hold the skin 506 against the upper pressing plate 502 when the shims are perforated. The perforations in the shims are selected so that the pressed dough balls are smooth and do not have indentations caused by the perforations in the shims. In certain implementations, when a textured surface on the pressed dough balls is desired, the perforations in the shims are selected based on the desired texture.

In certain implementations, the upper pressing plate 502 is attached to the skin 506 with a plurality of screws or bolts. The upper pressing plate 502 includes a plurality of threaded screw holes that align with corresponding apertures in the skin 506 that allow the screws to pass through the skin 506 and attach to the threaded screw holes. The screws are inserted into the threaded screw holes through the corresponding apertures and fixed in place.

Alternatively, the upper pressing plate 502 includes apertures that allow bolts to pass through the upper pressing plate 502 and attach to nuts. The nuts are secured to the end of the bolts that passes through the upper pressing plate 502 and hold the bolts and the skin 506 in place during processing.

The locations of the apertures are selected based on the pressing pattern of a recipe currently being used. For example, the apertures are disposed adjacent to the perimeter of the bottom surface 514 of the upper pressing plate 502. The location of the apertures is selected so that the apertures, and the screws or bolts placed in the apertures, do not align with a ball of dough during processing of the ball of dough. For example, the apertures are selected to provide the maximum support for the skin 506 while not aligning with a spacer placed between the skin 506 and the upper pressing plate 502. In some implementations, the apertures are selected so that the apertures do not align with heating elements (not shown) disposed within the upper pressing plate. The apertures are selected to that gaps do not form between the bottom surface 514 and the skin 506 and allow the skin 506 to cool.

In some implementations, the skin 506 is detachably coupled to the upper pressing plate 502 using one or more electromagnets placed in the upper pressing plate 502. Each electromagnet includes an electrically conductive wire wrapped into a coil and when an electrical current passes through the electrically conductive wire, the coil generates a magnetic field that attracts paramagnetic and ferromagnetic materials.

For example, the material for the skin 506 can be paramagnetic stainless steel that will attach to the upper pressing plate 502 when the electromagnets are turned on. In another example, the composition of the skin 506 includes iron. Steel and iron are structurally robust materials that have reduced wear.

When electromagnets are used to couple the skin 506 with the upper pressing plate 502, a composition of a lower pressing plate (not shown) is selected so that the lower pressing plate is not magnetic. For example, the lower pressing plate is made from aluminum.

In certain implementations, one or more clamps couple the skin 506 to the upper pressing plate 502. For example, two clamps attach each edge of the skin 506 to the upper pressing plate 502. The clamps use a compressive force to attach the edges of the skin 506 with the upper pressing plate 502 and hold the skin 506 in place during processing.

In one example, clamps are used in combination with electromagnetic coupling to ensure that there are no gaps between the upper pressing plate 502 and the skin 506. The introduction of gaps can cause cold spots on the skin 506, which reduce uniformity between pressed dough balls.

Figure 6:
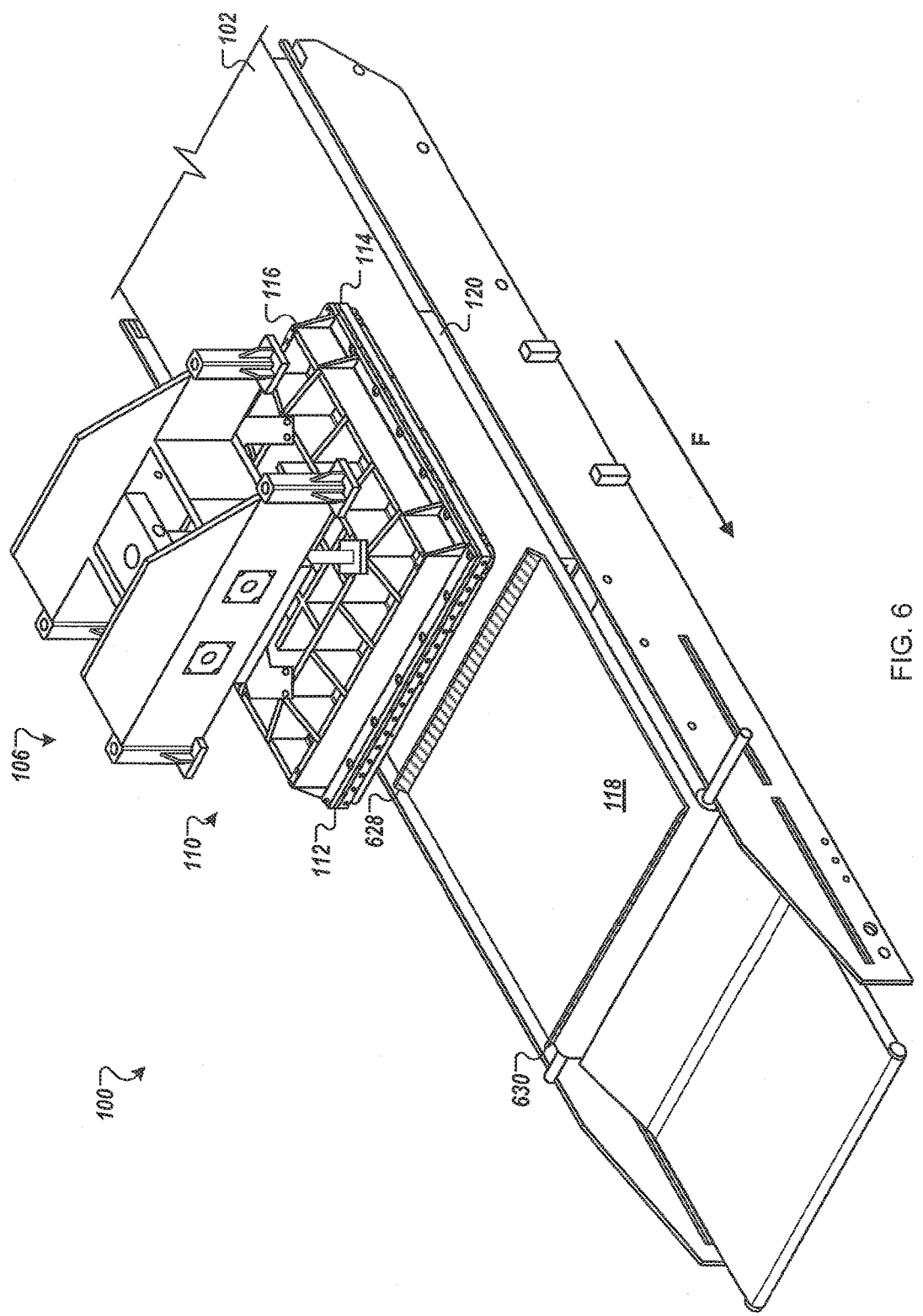
FIG. 6 is an example of the dough pressing apparatus of FIG. 1 with the skin removed from the upper pressing platen.

FIG. 6 is an example of the dough pressing apparatus 100 of FIG. 1 with the skin 118 removed from the upper pressing platen 110. For example, the skin 118 is removed from the upper pressing plate 114 for maintenance of the skin 118.

In some implementations, the skin 118 is removed from the upper pressing plate 114 when adjustments are required for the spacers between the skin 118 and the upper pressing plate 114. When the height of one or more of the spacers needs to be adjusted, all products (e.g., the balls of dough 104 and the pressed dough balls 108) are removed from the conveyor 102. The upper pressing platen 110 is lowered until the bottom surface of the skin 118 touches the top of the conveyor 102.

The skin 118 is released from the upper pressing platen 110, for example, by removing the vacuum pressure holding the skin 118 to the upper pressing plate 114. The upper pressing platen 110 is raised so that a back lip portion 628 of the skin 118 can move beneath the upper pressing platen 110.

The location of the conveyor 102 is indexed before the skin 118 is moved so that the conveyor 102 can later be positioned back in its current position and the skin 118 realigned with the upper pressing plate 114. After indexing, the conveyor 102 is moved in a forward direction until the skin 118 is no longer beneath the upper pressing platen 110.

Depending on the maintenance required, the skin 118 can be removed from the conveyor 102. For example, if a new recipe requires pressing a 6×6 pattern of dough balls and the skin 118 is configured for pressing a 5×6 pattern of dough balls, another skin configured for pressing a 6×6 pattern of dough balls can be placed on the conveyor. Alternatively, the thickness of spacers placed on the skin 118 can be adjusted.

Multiple skins can be stored in the same facility housing the dough pressing apparatus 100 to allow easy exchange of skins that are configured for different recipes. The different recipes can have different press cycle layout, such as a square 2×2 to a square 8×8 layout or a rectangular 5×6 or 4×3 layout. Different skins can be configured for different desired diameters of pressed dough. In some implementations, different skins are configured for dough with the same thickness. Use of a first skin will press a ball of dough uniformly on the top surface and while use of a second skin will press the center of a ball of dough, leaving the outer edge of the ball of dough thicker than the center.

In certain implementations, the skin 118 is removed from the upper pressing platen 110 so that a release agent (e.g., PAM or Teflon) can be reapplied to the skin 118. When the skin 118 is removed from the upper pressing platen 110, care should be taken to prevent the skin 118 from bending, which can reduce the performance of the skin 118 during pressing of balls of dough in the pressing station 106.

The skin 118 is removed from the conveyor 102 and a new skin is placed on the conveyor 102 manually. In this example, the back lip portion 628 includes an identifier so that a technician can differentiate the back lip portion 628 from a front lip portion.

Proper alignment of the skin 118 with respect to the upper pressing plate 114 ensures that when spacers of different thicknesses are placed on the skin 118, the spacers align properly with the upper pressing plate 114 and pressed dough balls formed by the dough pressing apparatus 100 have a diameter within a threshold variance from the desired diameter.

For example, when the dough pressing apparatus 100 forms two different sizes of pressed dough balls and a change in the recipe is required, a skin configured for the first diameter is easily exchanged with a skin already configured for the second diameter corresponding to the other recipe and the amount of down time required for the exchange is less than if a single skin or pressing plate needed to be reconfigured for the other recipe.

Figure 8A:
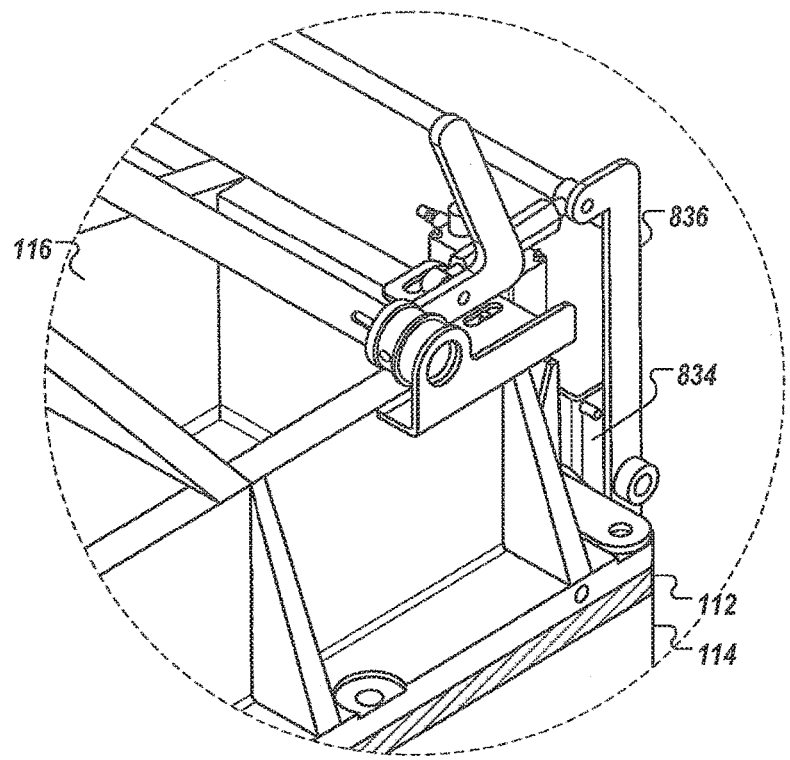
FIGS. 8A-B illustrate an example of a longitudinal aligner.
Figure 8B:
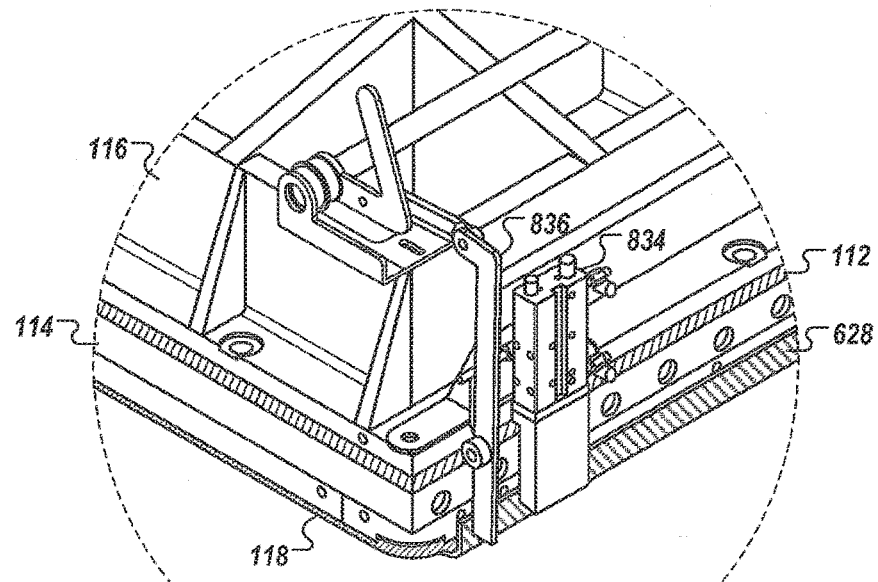

After the new skin is placed on the conveyor 102, the conveyor 102 is moved in a backward direction to the indexed position for alignment of the skin with the upper pressing plate 114. The pressing station 106 uses the back lip portion 628 to line up the latitudinal ends of the skin 118 with the upper pressing plate 114. For example, the back lip portion 628 contacts two latitudinal aligners 834, shown in FIGS. 8A-B, when aligning with the back edge of the upper pressing plate 114.

Figure 7:
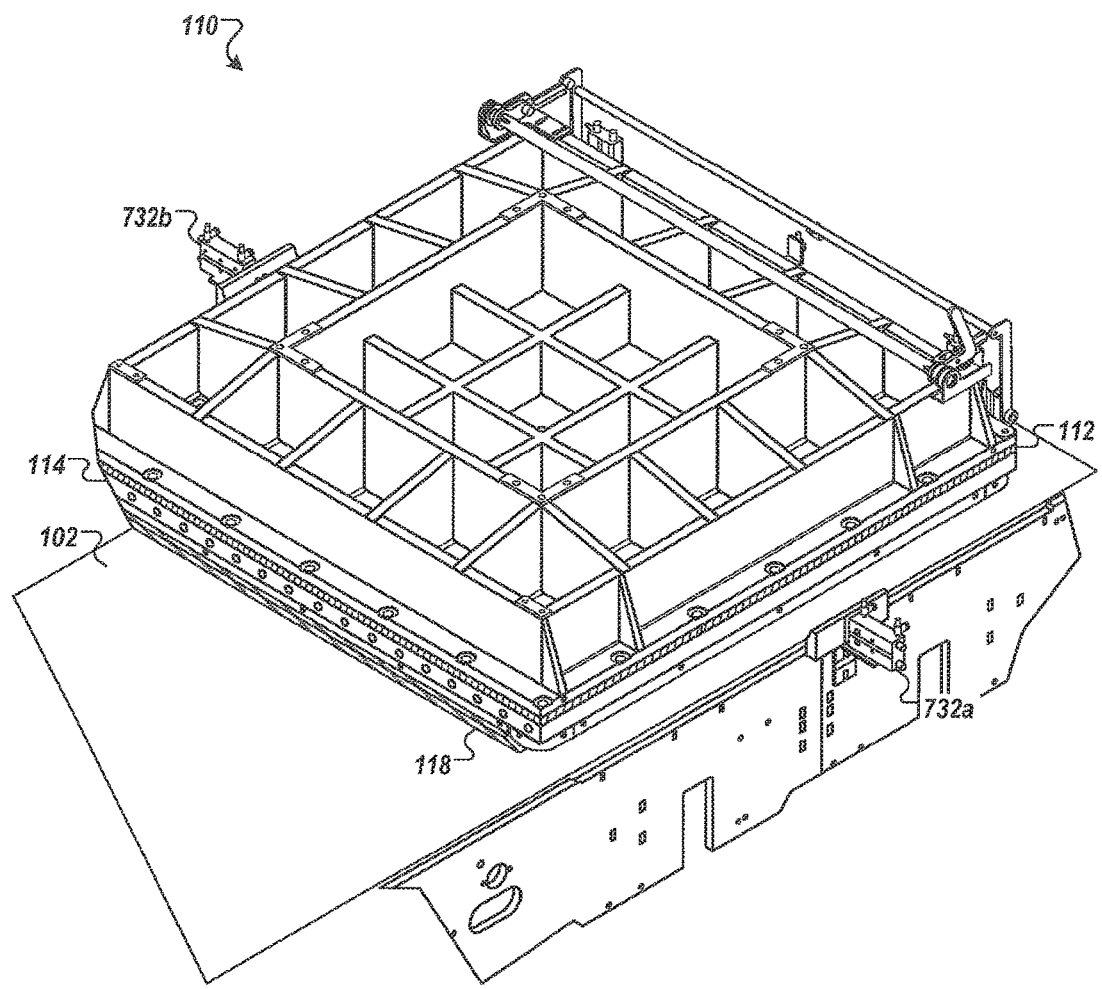
FIG. 7 illustrates an example of a latitudinal aligner.

Two longitudinal aligners 732a-b, shown in FIG. 7, on either side of the skin 118 align the longitudinal edges of the skin 118 with the longitudinal edges of the upper pressing plate 114 so that a vacuum seal between the skin 118 and the upper pressing plate 114 can be created. When the skin 118 is properly aligned with the upper pressing plate 114, an inflatable tube (e.g., the inflatable tube 510) is filled with air and a seal is formed between the upper pressing plate 114 and the skin 118 (e.g., by the seal 508).

In some implementations, an automated system removes and replaces the skin 118 in the pressing station 106. For example, when the dough pressing apparatus 100 receives input from a user indicating a recipe change, the dough pressing apparatus 100 determines if the skin 118 currently attached to the upper pressing plate 114 can be used for the new recipe. If the skin 118 cannot be used for the new recipe, the skin 118 is placed on the conveyor 102, moved to an unloading position, and a mechanical arm (not shown) grips to the back lip portion 628 and the front lip portion 630 of the skin 118 to remove the skin 118 from the conveyor 102.

The mechanical arm places the skin 118 on a tray and selects a new skin that is configured for the new recipe. The mechanical arm positions the new skin on the conveyor 102 and the new skin is attached, using vacuum pressure, to the upper pressing plate 114.

In order to prevent the skin 118 from accidently falling on the conveyor 102, one or more safeties 836 connect to holes in the back lip portion 628. For example, referring to FIG. 3A, the back lip portion (e.g., the lip portion 308a) includes two apertures 316a-b that align with the safeties 836. When the skin 118 is attached to the upper pressing plate 114, the safeties 836 extend into the apertures 316a-b so that if the vacuum suction should fail, the back lip portion 628 will be held in place and the skin 118 will not fall and move along the conveyor 102.

In some implementations, a skin rests on a top surface of the lower pressing plate 222 (FIGS. 2A-B) to protect the top surface of the lower pressing plate 222 from wear in a similar manner to the skin 118 protecting a bottom surface of the upper pressing plate 114. In one example, the skin is connected to the lower pressing plate 222 with fasteners. A user places the skin on the top surface of the lower pressing plate 222, centers the skin on the lower pressing plate 222 by aligning the edges of the skin with the edge of the lower pressing plate 222 and secures the fasteners in place.

In certain implementations, the lower skin is detachably coupled to the lower pressing plate 222 with vacuum. Using vacuum pressure to attach the lower skin to the lower pressing plate 222 allows the lower skin to be easily removed from the lower pressing plate 222 for maintenance. Alternatively, the lower skin is attached to the lower pressing plate 222 with screws or bolts. In these implementations, the lower skin includes apertures that allow the bolts to pass through the lower skin and connect to the lower pressing plate 222. In some implementations, the lower skin is held adjacent to an upper surface of the lower pressing plate 222 with one or more electromagnets.

The skin is removed from and attached to the lower pressing plate 222 during a maintenance cycle. For example, the conveyor 102 is removed from the dough pressing apparatus 100 to allow the skin to be replaced. Alternatively, the lower pressing platen 120 slides out from under the conveyor 102 to allow a user access to the lower skin. In some implementations, the skin 118 is removed from the upper pressing plate 114 during the same maintenance cycle.

In certain implementations, spacers, such as the spacers 310a-f, are placed between the skin and the lower pressing plate 222. The spacers are used to adjust the diameter of pressed dough balls that are processed in the pressing station 106. For example, spacers between the skin 118 and the upper pressing plate 114 and spacers between a skin and the lower pressing plate 222 are used at the same time to adjust thickness uniformity of dough balls pressed during a press cycle. In another example, there are one or more spacers between a skin and the lower pressing plate 222 and no spacers are used between the skin 118 and the upper pressing plate 114.

In some implementations, the dough pressing apparatus 100 does not include the lower pressing platen 120. For example, the conveyor 102 includes a product support that applies pressure to a bottom surface of the conveyor 102 and supports the conveyor 102 when the upper pressing platen 110 is forming the pressed dough balls 108. In these implementations, the pressed dough balls 108 are formed by the pressures applied to the balls of dough by the product support and the upper pressing platen 110 instead of the upper pressing platen 110 and the lower pressing platen 120.

Figure 9A:
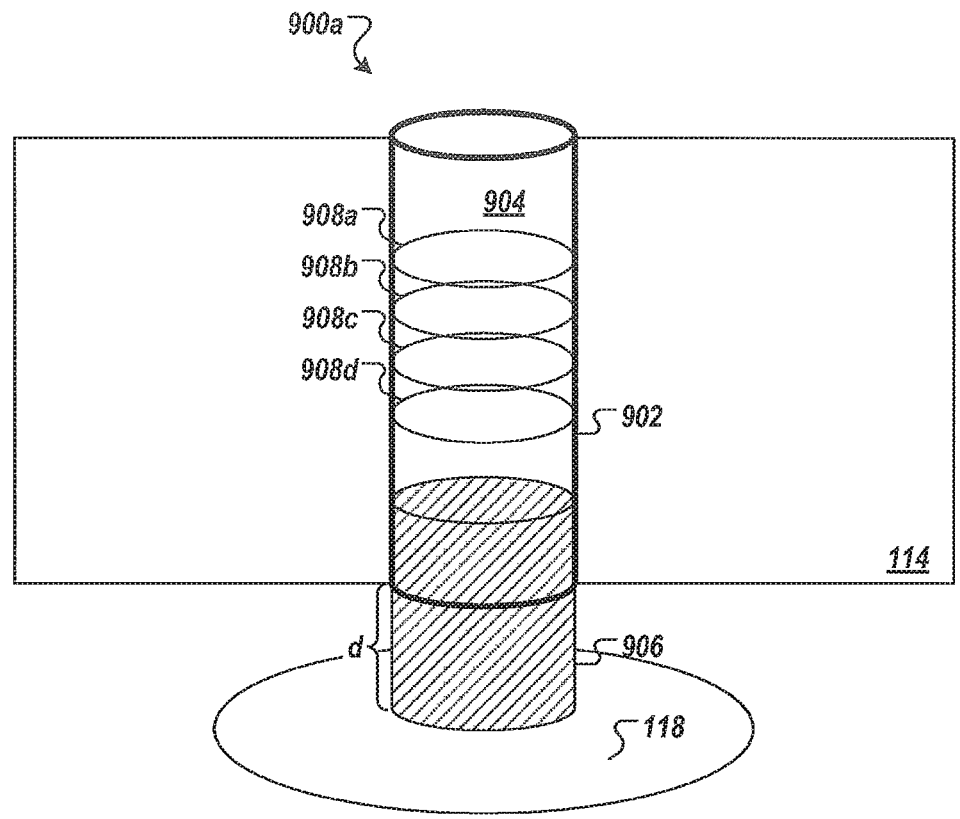
FIGS. 9A-B illustrate examples of spacers used to adjust dough thickness.
Figure 9B:
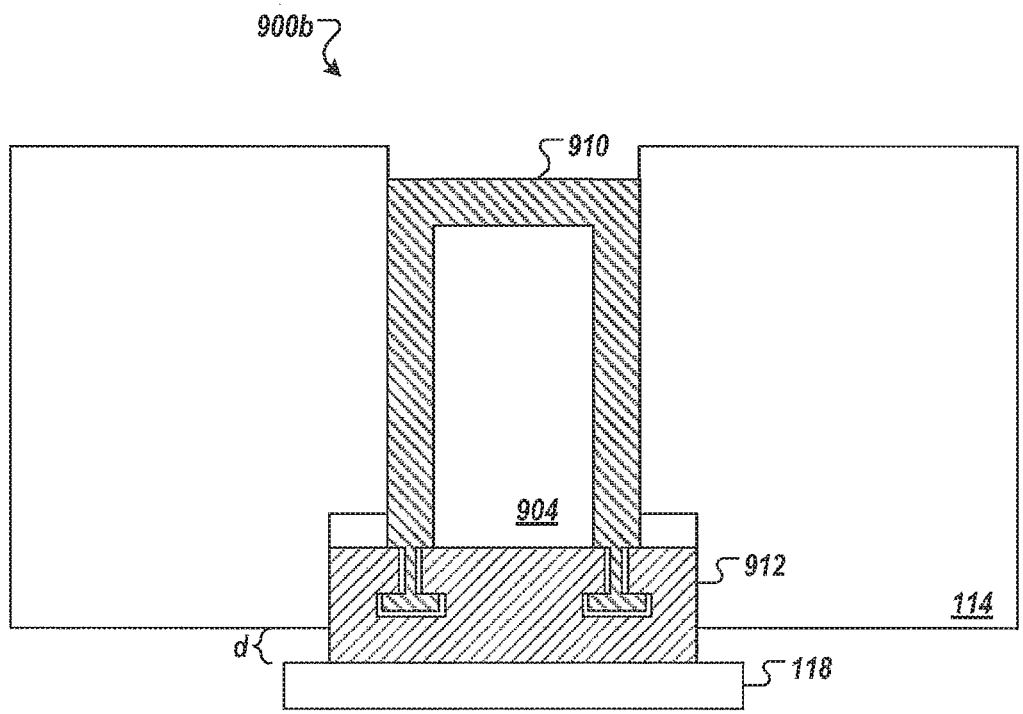

FIGS. 9A-B illustrate examples of spacers used to adjust dough thickness. A pressure pump 900a, shown in FIG. 9A, can be used as a spacer to adjust the amount of pressure applied to specific locations of the skin 118. For example, a plurality of pressure pumps 900a can be located in the upper pressing plate 114 where each of the pressure pumps 900a applies pressure downward onto different portions of the skin 118.

The pressure pump 900a includes a hollow cylinder 902 that is filled with a heat conducting fluid 904. When the heat conducting fluid 904 is pumped into the hollow cylinder 902, the heat conducting fluid 904 applies pressure on a heat conducting cylinder 906.

The amount of pressure the heat conducting fluid 904 places on the heat conducting cylinder 906 adjusts the distance d that the heat conducting cylinder 906 extends from a bottom end of the hollow cylinder 902 and past the bottom end of the upper pressing plate 114. As the distance d is adjusted, the amount of pressure applied to the skin 118 changes, adjusting the thickness and diameter of dough balls pressed at the corresponding location of the skin.

The upper pressing platen 110 includes one pressure pump for each square half-inch area of the upper pressing plate 114. For example, the bottom surface of the upper pressing plate 114 includes a plurality of apertures, where each aperture is about ½ by about ½ inch square and contains a pressure pump. The pressure pumps are attached to the aperture with adhesive. In some implementations, the pressure pumps are attached to the aperture with screws.

The pressure of each of the pressure pumps 900a is adjustable separately from the other pressure pumps 900a so that the distance between the upper surface of the skin 118 and the upper pressing plate 114 is customizable for each half inch square. The use of the grid of pressure pumps allows the upper pressing platen 110 to accommodate multiple different dough ball patterns, for example 4×4 and 5×5, without removing the skin 118 from the upper pressing platen 110. In some implementations, the grid of pressure pumps allows the thickness of pressed dough balls to be changed dynamically based on the measured diameters of the pressed dough balls.

In certain implementations, the pressure pump 900a is circular with a diameter corresponding to the desired diameter of a pressed dough ball. For example, when the upper pressing platen 110 is configured for a 3×3 pattern of dough balls and a desired diameter of 10 inches, the upper pressing plate 114 has a length and width of 42 inches, includes nine pressure pumps corresponding to the 3×3 pressing pattern, and each of the pressure pumps has a 12 inch diameter.

The hollow cylinder 902 includes one or more heating coils 908a-d located in the hollow portion of the hollow cylinder 902. The heating coils 908a-d are used to heat the heat conducting fluid 904 to ensure a uniform processing temperature of the balls of dough during pressing.

The heat conducting fluid 904 is an oil with good thermal conductive properties that transfers heat from the heating coils 908a-d to the skin 118. In certain implementations, the heat conducting fluid 904 is a gas, such as Argon. The heat conducting fluid 904 has a thermal conductivity of between about 10 to about 250 W/(m*K). In some implementations, the thermal conductivity of the heat conducting fluid 904 is selected to be between about 30 and about 500 W/(m*K). The heat conducting cylinder 906 is solid and has a thermal conductivity between about 5 to about 5500 W/(m*K), preferably between about 30 to about 1500 W/(m*K), more preferably between about 30 to about 500 W/(m*K).

In some implementations, the pressure pump 900a is square with a length between about ¼ to about 3 inches. For example, the pressure pump 900a has a length and a width of about 1 inch and the upper pressing platen 110 includes a grid of the pressure pumps.

FIG. 9B shows an example of a pressure bladder 900b (e.g., a spacer) used to apply pressure to the skin 118 and adjust the diameter of a pressed dough ball. The pressure bladder 900b includes a rubber bladder 910 that is filled with the heat conducting fluid 904.

A bottom end of the rubber bladder 910 is fit into a groove on an upper surface of a heat transfer plate 912 and a pump connects to the rubber bladder 910 and adjusts the pressure of the heat conducting fluid 904 in the rubber bladder 910.

The heat conducting fluid 904 heats the heat transfer plate 912, which conducts the heat to the skin 118 in order to control the processing temperature of balls of dough pressed by the upper pressing platen 110. The heat conducting fluid 904 applies pressure to the heat transfer plate 912, based on the pressure of the heat conducting fluid 904 in the rubber bladder 910, adjusting the distance d between the upper pressing plate 114 and the skin 118. As the distance d changes the thickness of dough pressed at a position corresponding to the pressure bladder 900b changes.

The heat transfer plate 912 has a thermal conductivity between about 5 to about 5500 W/(m*K), preferably between about 30 to about 500 W/(m*K). In some implementations, the rubber bladder 910 is composed of silicone, has a maximum service temperature of about 550° F., and a flexural strength of 22,800 PSI.

In some implementations, the pressure bladder 900b has an approximately square shape with a length between about ¼ to about 3 inches, preferably between about ½ to about 1½ inches, and a grid of pressure bladders 900b are disposed in the upper pressing plate 114.

In certain implementations, the pressure bladder 900b is circular with a diameter associated with a desired diameter of the pressed dough balls. For example, the pressure bladder 900b has a diameter of 7 inches and the desired diameter is 8 inches. In these implementations, the upper pressing platen 110 includes a plurality of pressure bladders 900b corresponding to a pattern of dough balls processed by the upper pressing platen 110.

Figure 10:
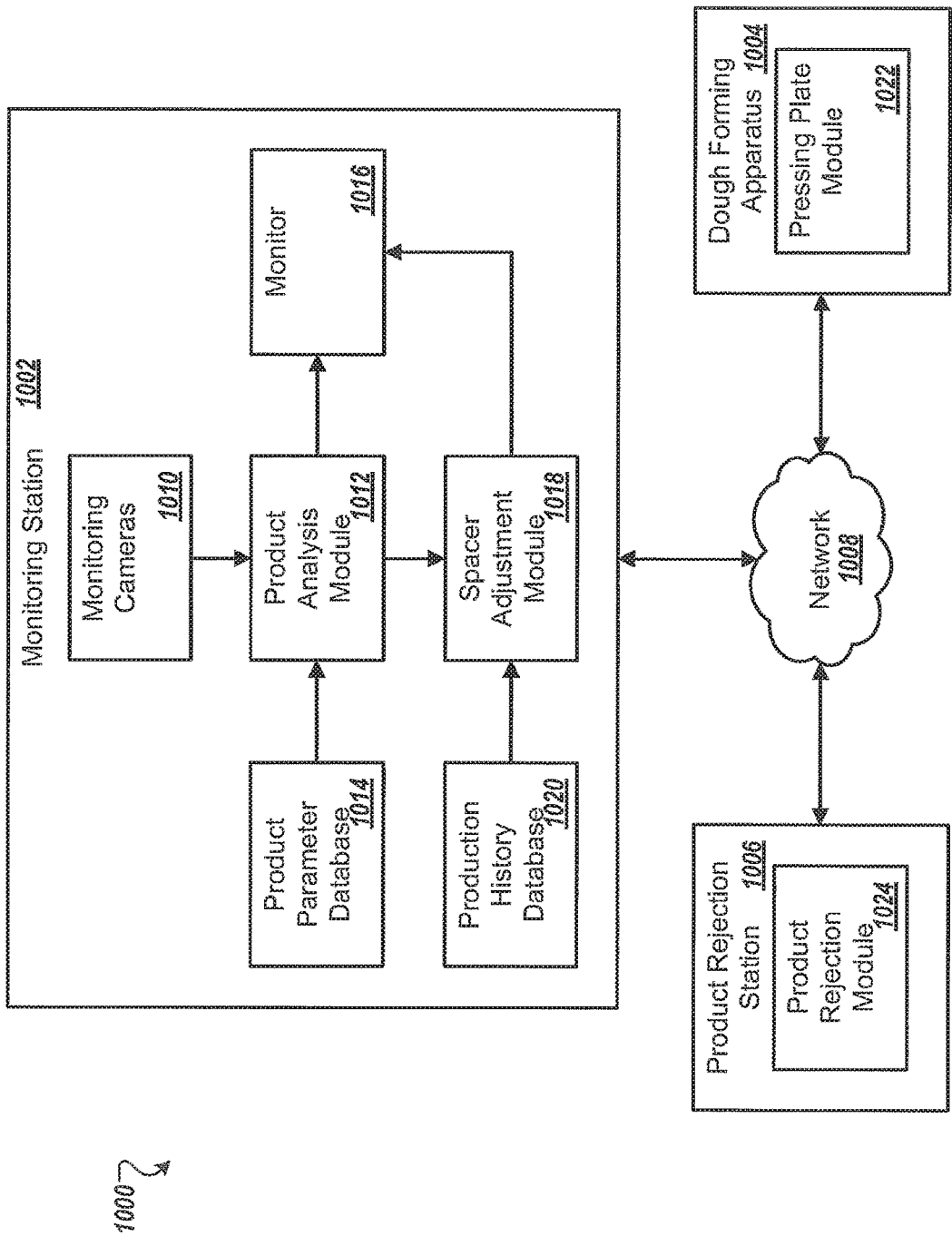
FIG. 10 is an example of a system for identifying a thickness adjustment for a spacer in a dough pressing apparatus.

FIG. 10 is an example of a system 1000 for identifying a thickness adjustment for a spacer in a dough pressing apparatus. The system 1000 includes a monitoring station 1002 that identifies the diameter of dough pressed in a dough forming apparatus 1004. The pressed dough is monitored after the dough has been pressed in the dough forming apparatus 1004 and baked in an oven (not shown). Alternatively, the monitoring station 1002 is physically located directly after the dough forming apparatus 1004 and before the oven.

The monitoring station 1002 averages a plurality of diameters of each dough ball to account for dough that is not a perfect circle but is otherwise acceptable and a product rejection station 1006 removes from the system 1000 any pressed dough balls that have an actual diameter that varies from a desired diameter by more than a threshold variance.

The monitoring station 1002, the dough forming apparatus 1004, and the product rejection station 1006 are connected using a network 1008. For example, the network 1008 is a local area network at a production facility that allows a remote user to monitor the production facility. In another example, the network 1008 connects separate stations in a production line and does not allow remote access to the status of the system 1000.

One or more monitoring cameras 1010 capture images (e.g., a video stream) of pressed dough balls as the pressed dough balls pass through the monitoring station 1002. A product analysis module 1012 receives the captured images from the monitoring cameras 1010 and identifies two or more diameters for each pressed dough ball in the captured images. For example, the product analysis module 1012 identifies between about 8 and about 124 diameters, preferably between about 16 and about 96 diameters, for each pressed dough ball.

In some implementations, the product analysis module 1012 is configured to identify differences in color between the pressed dough balls and a conveyor transporting the pressed dough balls. For example, the product analysis module 1012 receives parameters indicating the hue, saturation, and value (HSV) of the pressed dough balls so that the product analysis module can easily locate pressed dough balls positioned on the conveyor.

The product analysis module 1012 combines the multiple diameters associated with a specific pressed dough ball to determine an estimated diameter for the specific pressed dough ball. For example, the product analysis module 1012 determines the average of the diameter values.

In another example, the product analysis module 1012 determines a variance from a desired diameter for each of the multiple diameters and identifies an estimated diameter for the specific pressed dough ball based on the variance values. For example, the product analysis module 1012 applies weights to the variance values based on the value of the variance and combines the weighted variance values. In some implementations, larger variance values are weighted more than smaller variance values.

The product analysis module 1012 retrieves recipe parameters from a product parameter database 1014 and compares the retrieved recipe parameters to the estimated dough ball diameter. The recipe parameters indicate the desired diameter and variance threshold values for the dough currently being processed by the system 1000. For example, the recipe parameters can include an over variance threshold value, used when the measured diameter is greater than a desired diameter, and an under variance threshold value, used when the measured diameter is smaller than the desired diameter.

The product analysis module 1012 presents the recipe parameters and the estimated dough ball diameters on a monitor 1016. For example, the product analysis module 1012 presents product comparison information to a user of the system 1000. In some implementations, the user can adjust the recipe parameters based on the comparison information.

A spacer adjustment module 1018 receives the estimated dough ball diameters and the desired diameter from the product analysis module 1012 and retrieves production history information. For example, the spacer adjustment module 1018 identifies the specific location where a monitored dough ball was pressed in a pressing pattern.

The spacer adjustment Module 1018 determines the diameter variances for each of the dough balls pressed at that specific location to determine an average estimated diameter for the dough balls produced for the current recipe at the specific pressing pattern location. In some implementations, the spacer adjustment module 1018 presents the average estimated diameter variance for the specific pressing pattern location on the monitor 1016.

The spacer adjustment module 1018 determines the average diameter variances for each dough ball location in the pressing station to create a grid of variance values that corresponds with the pressing pattern of the current recipe. The spacer adjustment module 1018 compares the grid of variance values with information in a production history database 1020 to identify history information similar to the grid of variance values.

Based on the information retrieved from the production history database 1020, the spacer adjustment module 1018 identifies thickness adjustments for the spacers in the pressing station so that the actual diameters of dough pressed in the pressing station has a smaller variance from the desired diameter for the current recipe than the current variance.

In some implementations, the production history database 1020 is created during testing of pressing pattern layouts. Spacer thickness changes are monitored during the testing of a specific pressing pattern layout to identify the spacer adjustments that work best for the pressing pattern layout and a specific grid of variance values. For example, the spacer adjustment module 1018 records the actual pressed dough diameters measured before and after a spacer thickness adjustment and the values associated with the spacer thickness adjustment. The spacer adjustment module 1018 classifies the spacer thickness adjustments to determine which spacer thickness adjustments reduced the combined variance in a grid of variance values in order to produce pressed dough ball diameters with less variance from the desired diameter.

After testing, when the spacer adjustment module 1018 receives information related to pressed dough balls made according to a recipe, the spacer adjustment module 1018 identifies a spacer thickness adjustment with a first grid similar to the current grid of variance values in order to reduce the variance between the pressed dough ball diameters and the desired diameter. For example, the spacer adjustment module 1018 identifies the record or records in the production history database 1020 that most closely match the current grid of variance values in order to generate a recommendation of spacer thickness changes.

A spacer thickness recommendation specifies the total thickness of a spacer used in a pressing pattern. In other implementations, a spacer thickness recommendation indicates a recommended change to a current spacer thickness. For example, a spacer thickness recommendation can indicate that 0.025 inches should be removed from a specific spacer.

In some implementations, the spacer adjustment module 1018 updates the production history database 1020 based on recommendations made by the spacer adjustment module 1018 and spacer adjustments made according to the recommendations. For example, if the spacer adjustment module 1018 presents a user with a grid of spacer thickness adjustments on the monitor 1016, once production in the system 1000 continues, the spacer adjustment module 1018 identifies the new actual diameters of the pressed dough balls and correlates the new actual diameters with the spacer thickness adjustments and the actual diameters before the thickness adjustments were made.

The spacer adjustment module 1018 optionally uses machine learning to update the production history database 1020 in order to make accurate spacer adjustment recommendations. For example, machine learning is used to compensate for potential variances between different dough processing systems.

In certain implementations, when the dough forming apparatus 1004 can adjust the spacer thicknesses on the fly, the spacer adjustment module 1018 provides spacer adjustment parameters to a pressing plate module 1022. For example, the pressing plate module 1022 uses the spacer adjustment parameters to change the pressure applied to a specific portion of a skin and the diameter of dough pressed at that specific portion of the skin, reducing the variance between the dough diameter and a desired diameter.

When the product analysis module 1012 identifies a pressed dough ball that does not meet requirement standards, the product analysis module 1012 optionally provides a message to a product rejection module 1024. The product rejection module 1024 controls a product rejection device in the product rejection station 1006 that removes rejected pieces of dough from the system 1000 when the rejected pieces do not meet specific standards.

For example, when the product analysis module 1012 identifies a piece of dough that is burnt, has cracks or holes, does not have the shape specified by the recipe, or with a size variance that is greater than a threshold variance, the product rejection module 1024 can remove the piece of dough from the system 1000.

Figure 11:
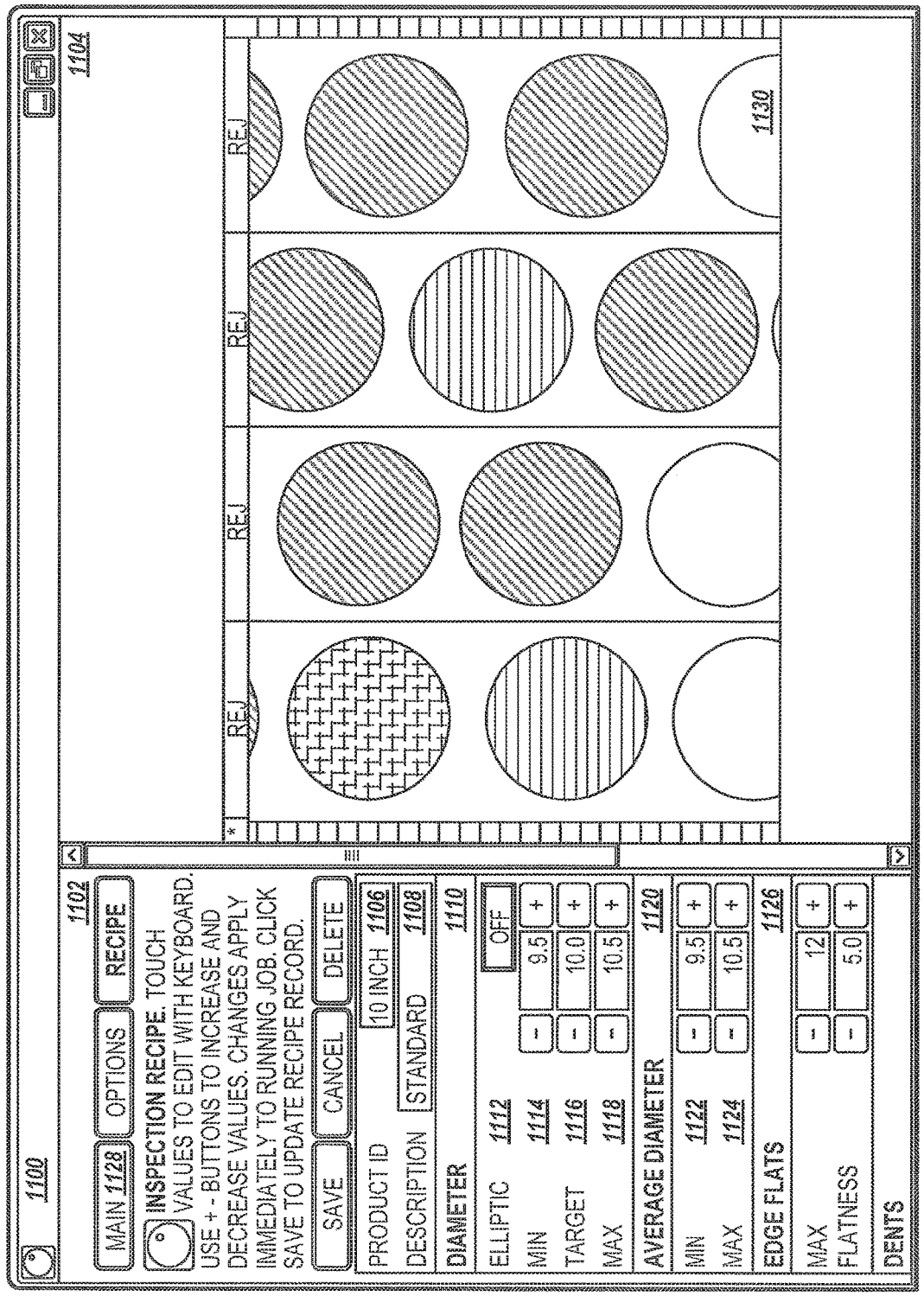
FIG. 11 illustrates an example user interface for entering recipe parameters.

FIG. 11 illustrates an example user interface 1100 for entering recipe parameters. The user interface 1100 includes a recipe entry section 1102 and an information section 1104. The recipe entry section 1102 presents details about the current recipe a dough pressing apparatus is using.

For example, the recipe entry section 1102 includes a product ID 1106 and a product description 1108. The product ID 1106 is a unique identifier specific to a single product or product recipe. When a recipe is initially entered into a dough pressing apparatus, a user provides the product ID 1106 to the system. The product description 1108 allows a user to enter a general description of the recipe used for the product. For example, if two product IDs are "10 inch" and "10 inch e" the corresponding descriptions can be "standard" and "elliptical" respectively. In some implementations, the product description 1108 allows a user to enter more detailed information about a product or recipe than can be entered in the product ID 1106.

The recipe entry section 1102 includes a diameter parameter section 1110 that allows a user to enter information about the desired diameter of pressed dough balls. For example, an elliptic selection 1112 allows a user to specify if the desired dough ball shape is elliptic (e.g., "On") or circular (e.g., "Off"). In some implementations, when the desired dough ball shape is elliptic, the diameter parameter section includes a foci distance field. The foci distance field receives input from a user specifying the desired distance between the two foci in elliptically shaped pressed dough balls.

The diameter parameter section 1110 includes a minimum desired diameter field 1114, a target desired diameter field 1116, and a maximum desired diameter field 1118 in the diameter parameter section 1110. When a monitoring station identifies a pressed dough ball with an actual diameter outside of the diameter range provided in the diameter parameter section 1110, a product rejection station can remove the pressed dough ball from the system that includes the dough pressing apparatus.

For example, if a pressed dough ball has an average diameter smaller than the minimum desired diameter, the product rejection station removes the pressed dough ball from the system. In another example, when multiple diameters are measured for a pressed dough ball, if any of the multiple diameters is greater than the maximum desired diameter, the product rejection stations removes the pressed dough ball from the system.

When a system uses a maximum variance value is used instead of a maximum and/or minimum diameter, the maximum variance value can be based on the maximum and/or minimum diameter. Alternatively, the diameter parameter section 1110 includes a maximum variance value field.

In some implementations, the recipe entry section 1102 includes an average diameter section 1120. The average diameter section 1120 includes a minimum average field 1122 and a maximum average field 1124 that receive an average minimum and maximum respectively from a user. When using the average diameter section 1120, the minimum average diameter value and the maximum average diameter value are compared with the actual average diameter of a measured dough ball to determine if the measured dough ball should be rejected from the system or if the thickness of a spacer should be adjusted in a dough pressing apparatus.

The recipe entry section 1102 includes one or more sections for entry of additional product rejection parameters. For example, the user interface 1100 includes an edge flats section 1126 that receives input indicating an acceptable edge defect value of the pressed dough balls. The acceptable edge defect value, for example, specifies the number of contiguous measured diameters for a single pressed dough ball that can be less than a minimum desired diameter or more than a maximum desired diameter.

In one example, the maximum number of edge flats is 12, the desired dough diameter is 10 inches, and the threshold variance is 0.5 inches. If a product analysis module identifies thirteen adjacent measured diameters of a specific pressed dough ball that are less than 9.5 inches, then the product analysis module determines that the specific pressed dough ball does not meet the diameter requirements. If the product analysis module determines that there are at most seven adjacent measured diameters of a specific pressed dough ball that vary from the desire dough diameter by more than the threshold variance, then the product analysis module determines that the specific pressed dough ball meets the diameter requirements.

In certain implementations, the recipe entry section 1102 includes a dent specification section. For example, the dent specification section receives input from a user that specifies the maximum size and shape of allowable dents in pressed dough balls. If a monitoring station identifies a dent in a pressed dough ball where the dent is outside of the dent parameters, the rejection station removes the pressed dough ball from the system. In some implementations, the dent specification section includes one or more fields for parameters associated with cracks or other potential deformations in pressed dough balls.

In one example, the recipe entry section 1102 includes a dough color section that allows a user to specify acceptable color ranges of the pressed dough balls. For example, after the pressed dough balls have been baked, a monitoring station determines if a pressed dough ball includes discolorations cause by overheating during the baking process. If the monitoring station identifies a pressed dough ball with a discoloration, the pressed dough ball can be moved to another system. In some implementations, the monitoring station identifies discolorations caused during the pressing processes.

The recipe entry section 1102 allows a user to delete a recipe, make changes to a recipe and save the changes, and cancel changes made to a recipe currently presented in the user interface 1100. For example, a user can delete a recipe that is no longer in use after testing multiple similar recipes and selecting a preferred recipe. In another example, a user can adjust or view recipe settings for a recipe currently in use by a dough pressing apparatus. Selection of a save or a cancel button will return the user interface to a main screen (e.g., shown in FIG. 13). Alternatively, a user can select a main screen button 1128 to return to the main screen.

In some implementations, the information section 1104 presents information about the recipe currently in use by the dough pressing apparatus. For example, a current monitoring camera view 1130 presents the user with a view of the pressed dough balls moving through the system.

Figure 12:
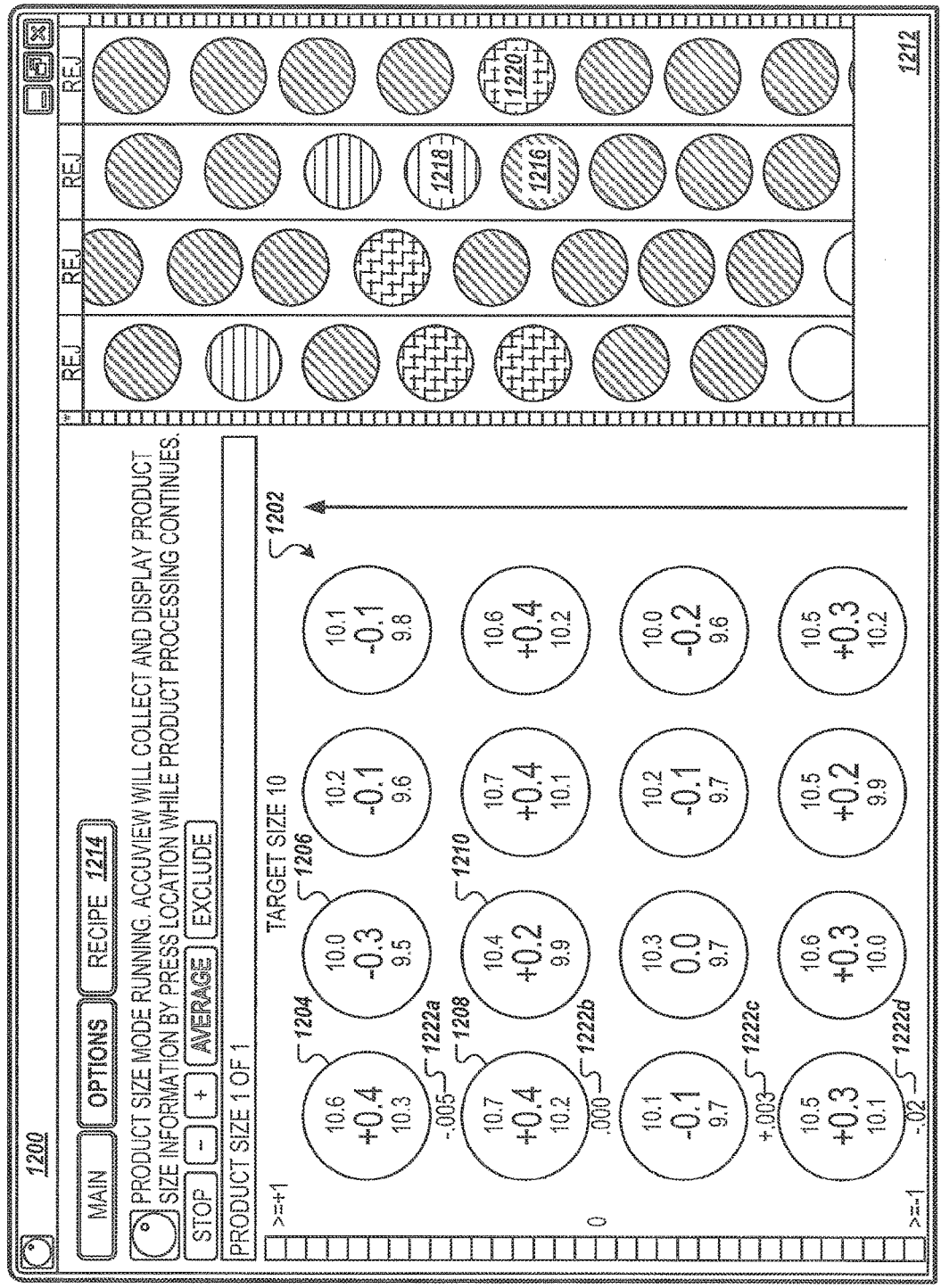
FIG. 12 illustrates an example user interface presenting a grid of average variance values.

FIG. 12 illustrates an example user interface 1200 presenting a grid of average variance values 1202. The grid of average variance values 1202 represents the average diameter variance from a desired diameter for each location in a pattern of dough balls. The grid of average variance values 1202 is used to identify where the thickness of a spacer in a pressing apparatus should be adjusted.

For example, a first pressing pattern location 1204 indicates that the average diameter of a ball of dough pressed at a corresponding location in the pressing apparatus is +0.4 inches greater than the desired diameter of 10 inches. The first pressing pattern location 1204 can present information indicating the range of diameters for balls of dough pressed at the corresponding location. For example, the minimum diameter of a dough ball corresponding with the first pressing pattern location 1224 is 10.3 inches and the maximum diameter is 10.6 inches.

Based on the variance values in the grid of average variance values 1202, a spacer adjustment pattern can be determined. For example, a thickness adjustment for a spacer corresponding to the first pressing pattern location 1204 can be based on the variance specified by the first pressing pattern location 1204 and the adjacent pressing pattern locations. In this example, a variance of −0.3 inches at a second pressing pattern location 1206, a variance of +0.4 inches at a third pressing pattern location 1208, and a variance of +0.2 inches at a fourth pressing pattern location 1210 are used to determine the spacer thickness adjustment corresponding to the first pressing pattern location 1204. In another example, the variances at the first pressing pattern location 1204, the second pressing pattern location 1206, and the third pressing pattern location 1208 are used to determine a thickness adjustment for the spacer associated with the first pressing pattern location 1204.

In some implementations, the user interface 1200 includes a pressed dough preview section 1212. For example, one or more video cameras in a monitoring station capture a video sequence of pressed dough passing on a conveyor through the monitoring station and the video sequence is presented in the pressed dough preview section 1212.

A user can view the pressed dough preview section 1212 to see the dough as it passes through the monitoring station and determine if recipe parameters should be adjusted. For example, the user can change recipe parameters in the user interface 1100 by selecting a recipe button 1214.

The pressed dough preview section 1212 includes markers that indicate the quality of the pressed dough passing through the monitoring station. For example, a first marker 1216 indicates that a pressed dough ball has little variance from the desire recipe parameters, a second marker 1218 indicates that an associated piece of dough has some variances from the desired recipe parameters, and a third marker 1220 indicates that a corresponding dough piece has a greater variance and should be discarded.

In some implementations, the markers are colored squares that surround pieces of dough as the dough pieces are presented in the pressed dough preview section 1212. In other implementations, pieces of dough are highlighted with a color based on the quality of the dough circling the piece of dough.

The pressed dough preview section 1212 allows the user to identify defective dough before a product rejection system removes the defective dough from the processing system.

In certain implementations, the grid of average variance values 1202 includes spacer adjustment recommendations 1222*a-d*. For example, a spacer adjustment module identifies shim thickness adjustments to make based on the grid of average variance values 1202 and presents the spacer adjustment recommendations 1222*a-d* with the grid of average variance values 1202 on a monitor.

A user of a dough pressing apparatus can view the spacer adjustment recommendations 1222*a-d* in order to determine adjustments to make, during a maintenance cycle, to spacers placed on a skin. Presentation of the spacer adjustment recommendations 1222*a-d* allows the user to more easily identify where space adjustments are needed and how much of an adjustment to make.

Figure 13:
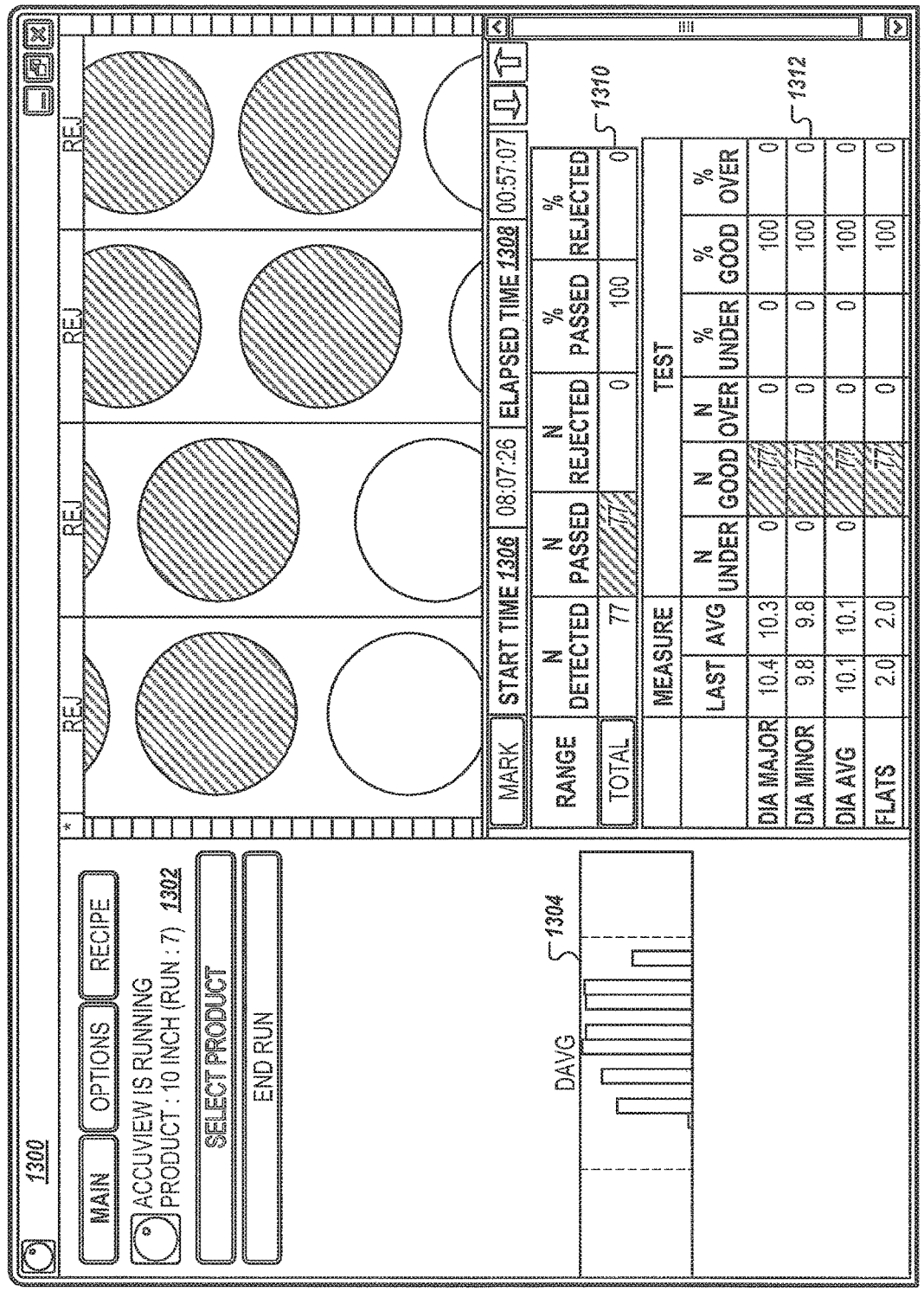
FIG. 13 illustrates an example user interface presenting recipe history information.

FIG. 13 illustrates an example user interface 1300 presenting recipe history information. The history information includes data about the recipe currently running and the dough parameters measured during the current run time. For example, the user interface 1300 includes a recipe information section 1302 and a statistical distribution graph 1304 of the measure diameters of the pressed dough balls. The recipe information section 1302 includes the name of the recipe currently running on a dough pressing apparatus and the total number of times the recipe has run.

The statistical distribution graph 1304 presents the average measured dough ball diameter for the current recipe process and the standard deviation from the average. The statistical distribution graph 1304 presents the actual measured dough ball diameters with respect to the average diameter. In some implementations, the statistical distribution graph 1304 presents information associated with acceptable pressed dough balls, and information associated with discarded pressed dough balls is not included.

The user interface 1300 includes a start time section 1306 and an elapsed time section 1308. The start time section 1306 presents the time that the current recipe process was started. In some implementations, the start time section 1306 includes both the time and the date that the process was started. The elapsed time section 1308 indicates the total time that the current recipe process has been running.

A recipe overview section 1310 presents general information about the current run of the recipe. For example, the recipe overview section 1310 includes the total number of pressed dough balls that have been processed during the current recipe process, the total number of pressed dough balls that meet the recipe parameters, and the total number of pressed dough balls that have been rejected by a monitoring system. In certain implementations, the recipe overview section 1310 includes percentages associated with accepted pressed dough balls and rejected pressed dough balls.

In some implementations, the user interface 1300 includes additional information about the current recipe process. For example, a production run section 1312 presents a breakdown of statistics for the current recipe process. Information presented in the production run section 1312, for example, can be based on the recipe parameters included in the recipe entry section 1102.

The production run section 1312 includes statistics on the maximum and minimum diameters measured for each pressed dough ball and the average diameter for each pressed dough ball. For example, when a specific pressed dough ball is measured by a monitoring station, the monitoring station can measure about 64 diameters of the specific pressed dough ball. A product analysis module determines the major and minor diameters from the 64 measured diameters and updates the "DIA MAJOR" and "DIA MINOR" statistics respectively. The product analysis module averages all of the 64 measured diameters and updates the "DIA AVG" statistic. If the major and minor diameters are within an acceptable range (e.g., determined based on the minimum desired diameter field 1114 and the maximum desired diameter field 1118) and the average diameter is acceptable (e.g., based on the minimum average field 1122 and the maximum average field 1124) the specific pressed dough ball is kept. If one of the values is outside of an acceptable range, a product rejection station can remove the specific pressed dough ball from the dough pressing system.

Figure 14:
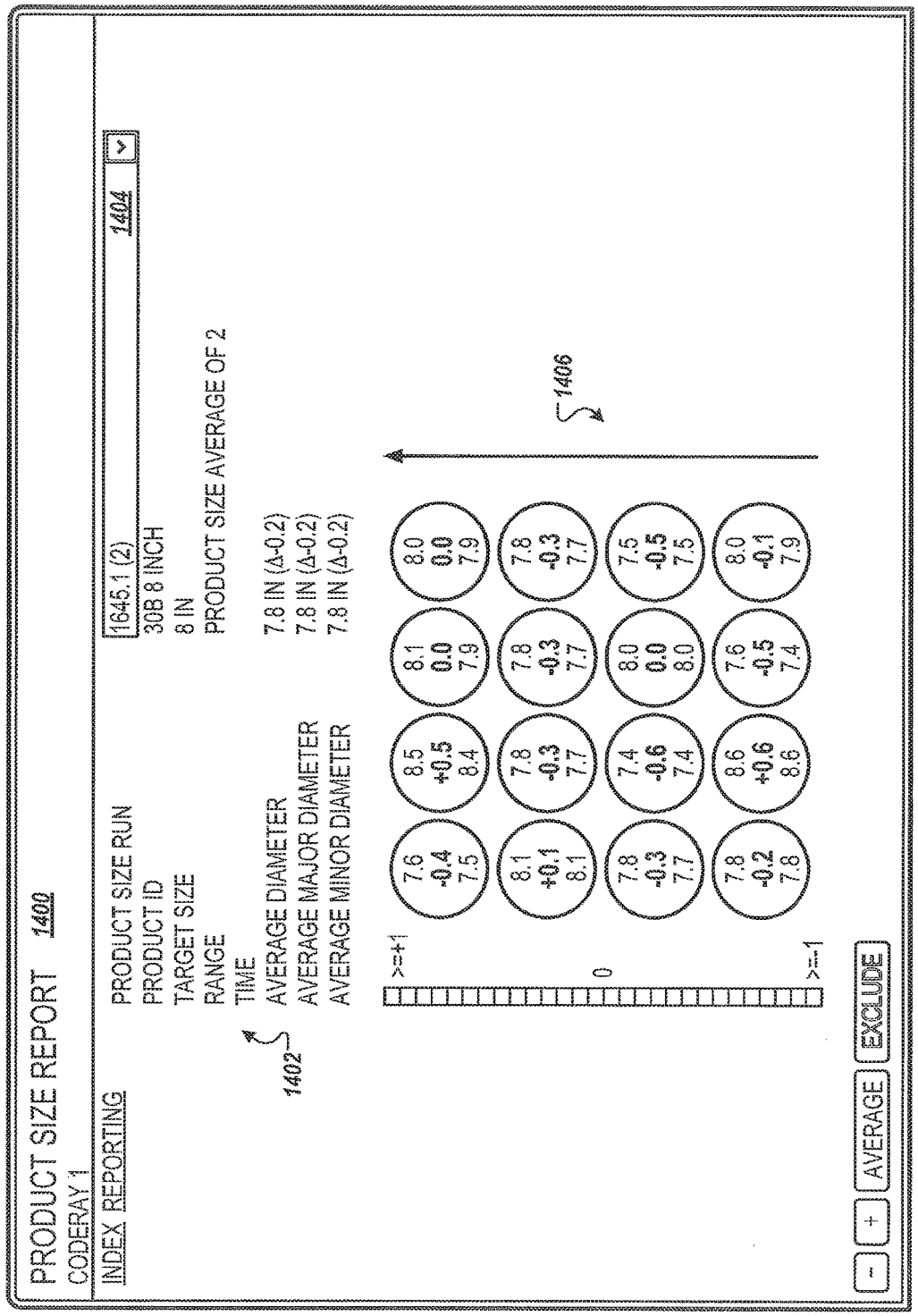
FIG. 14 illustrates another example user interface presenting recipe history information.

FIG. 14 illustrates another example user interface 1400 presenting recipe history information. The user interface 1400 includes a recipe detail section 1402 that presents recipe specific information. For example, the recipe detail section 1402 includes the product ID, the target size (e.g., desired diameter), and the diameter variance acceptable for the product. The recipe detail section 1402 presents information to a user without allowing the user to change the information.

The recipe detail section 1402 includes average values for the measure diameters of the pressed dough balls. Additionally, the recipe detail section 1402 includes the average major and minor pressed dough ball diameters. The average major and minor pressed dough ball diameters can be used to determine the range of sizes of the pressed dough balls.

In some implementations, the major and minor pressed dough ball diameters are used to determine the shape of the pressed dough balls. For example, when the difference between the average major and minor pressed dough ball diameters is small, the pressed dough balls are more circular in shape, and when the difference between the average major and minor diameters is larger, the pressed dough balls have more of an elliptical shape.

A product size run selection 1404 allows a user to select the recipe history information to present in the user interface 1400. For example, a user is presented with a list of recipes previously run on a dough pressing apparatus and the user selects one of the recipes to view information about the previously run recipe. Changing the product size run selection 1404 changes the process parameters presented in the recipe detail section 1402.

The user interface 1400 includes a grid of pressed dough ball variances 1406 and measured diameters associated with the variances. For example, when a pattern of dough balls is a 4×4 grid, the grid of pressed dough ball variances 1406 includes sixteen variance values and the maximum and minimum average diameters measured at the pressing pattern locations associated with the corresponding variances.

Figure 15A:
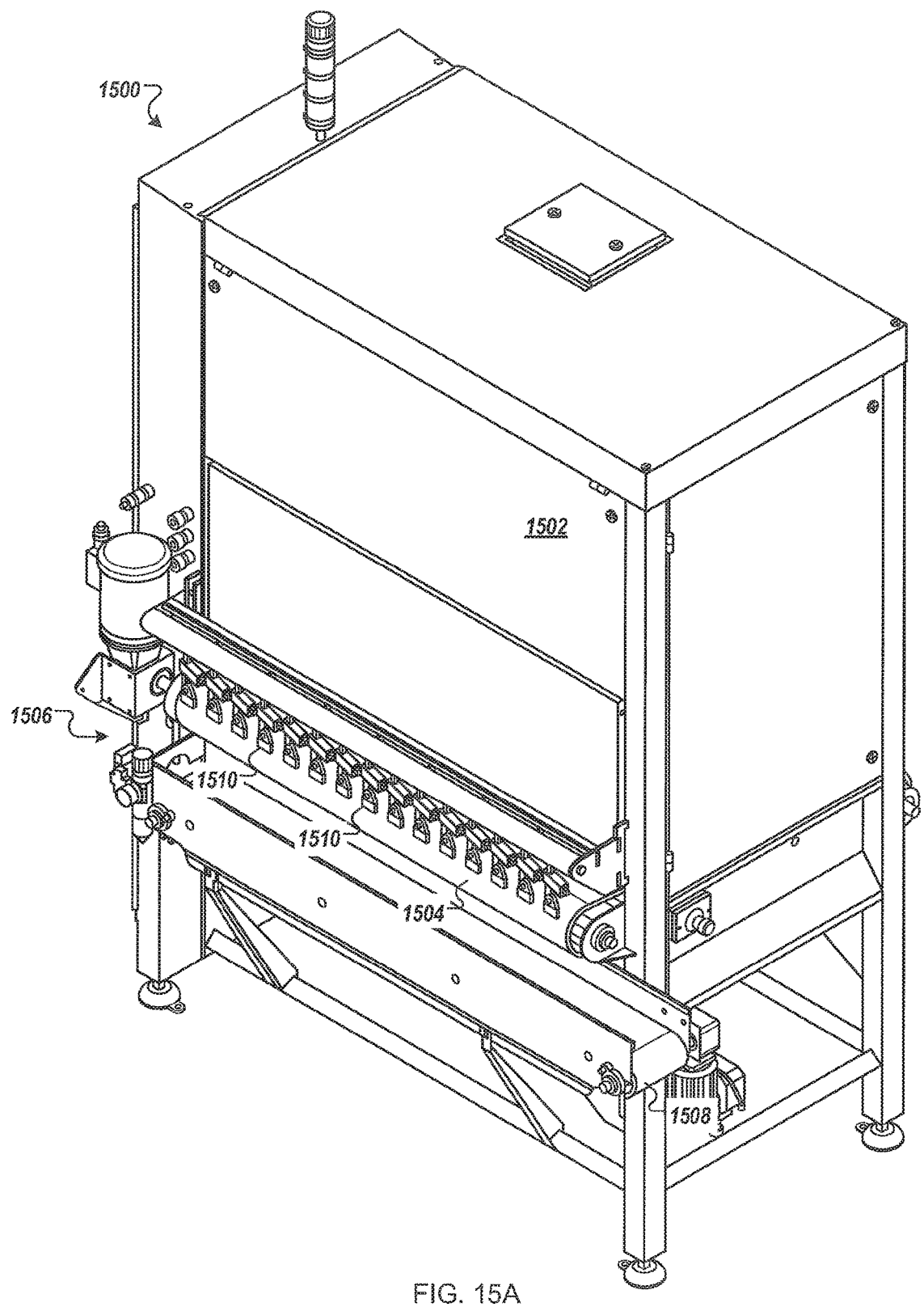
FIGS. 15A-B show an example of a product monitoring station.
Figure 15B:
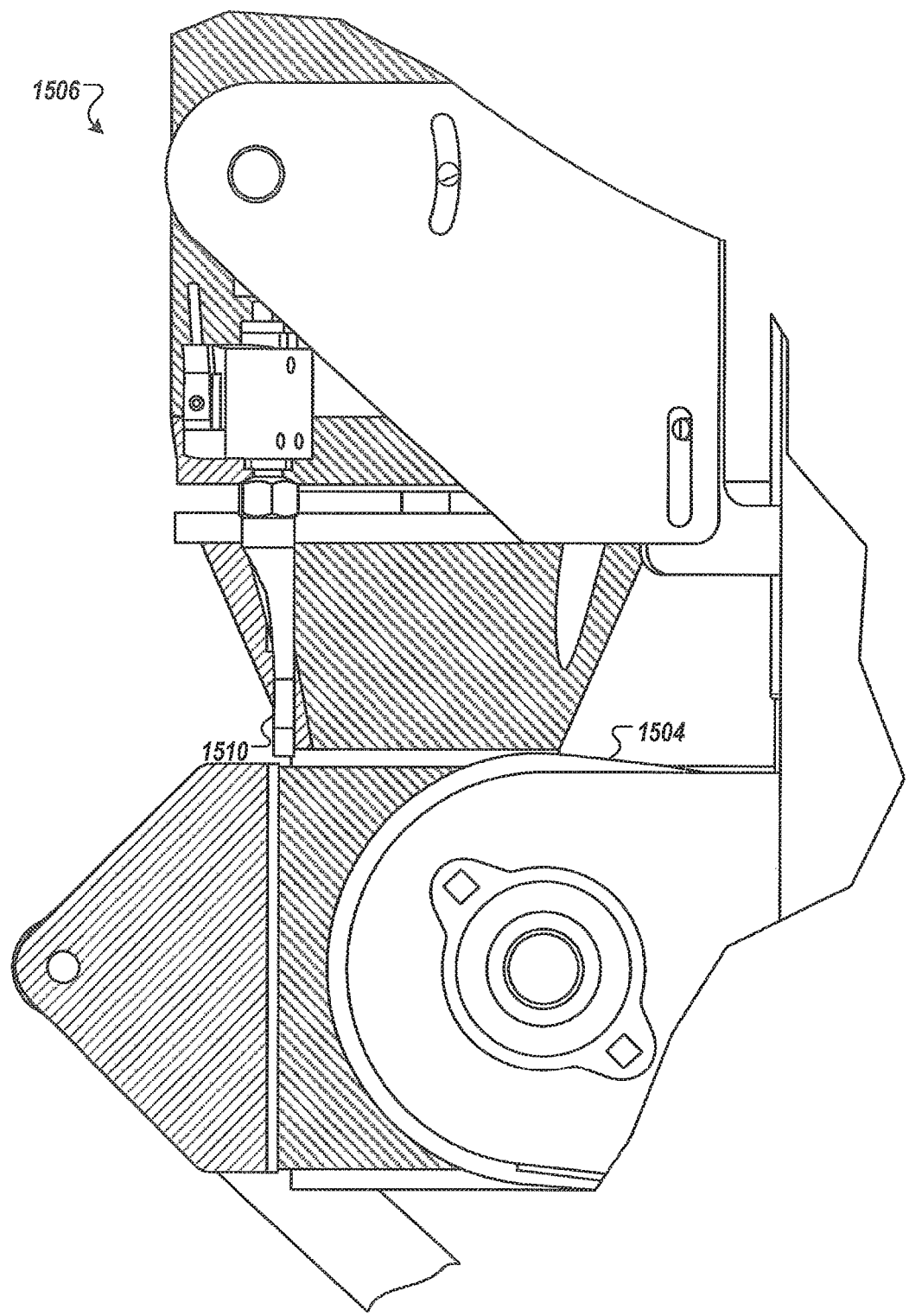

FIGS. 15A-B show an example of a product monitoring station 1500. The product monitoring station 1500 includes a housing 1502 for one or more monitoring cameras (not shown) that capture a video stream of pressed dough balls transported on a conveyor 1504.

The video stream captured by the monitoring cameras is used to identify defective pressed dough balls so that a product rejection station 1506 can remove the defective pressed dough balls from the conveyor 1504. The product monitoring station 1500 includes a secondary conveyor 1508 that transports the defective pressed dough balls once the defective pressed dough balls have been removed from the conveyor 1504.

FIG. 15B is an example of the product rejection station 1506 included in the product monitoring station 1500. The product rejection station 1506 includes a plurality of rejection devices 1510 that remove the defective pressed dough from the conveyor 1504.

A product analysis module analyzes the video stream captured by the monitoring cameras and identifies defective pressed dough balls in the video stream. The product analysis module determines the location of a defective pressed dough ball on the conveyor 1504 and the time that the defective pressed dough ball will pass underneath a specific one of the rejection devices 1510. When the defective pressed dough ball passes underneath the specific rejection device 1510, the rejection device 1510 moves the defective pressed dough ball to the secondary conveyor 1508 while acceptable pressed dough balls move automatically to another conveyor (not shown) adjacent to the conveyor 1504.

In some implementations, automatic removal of pressed dough balls that do not meet recipe requirements increases throughput of a dough pressing apparatus.

In certain implementations, the rejection devices 1510 remove defective pressed dough balls from the system mechanically. In other implementations, the rejection devices 1510 remove defective pressed dough balls from the system with a blast of air. For example, when the defective pressed dough ball is moving from the conveyor 1504 to an adjacent conveyor, a blast of air from one of the rejection devices 1510 blows downward on the defective pressed dough ball when the defective pressed dough ball is moving from the conveyor 1504 to the adjacent conveyor, and the defective pressed dough ball lands on the secondary conveyor 1508.

Figure 16:
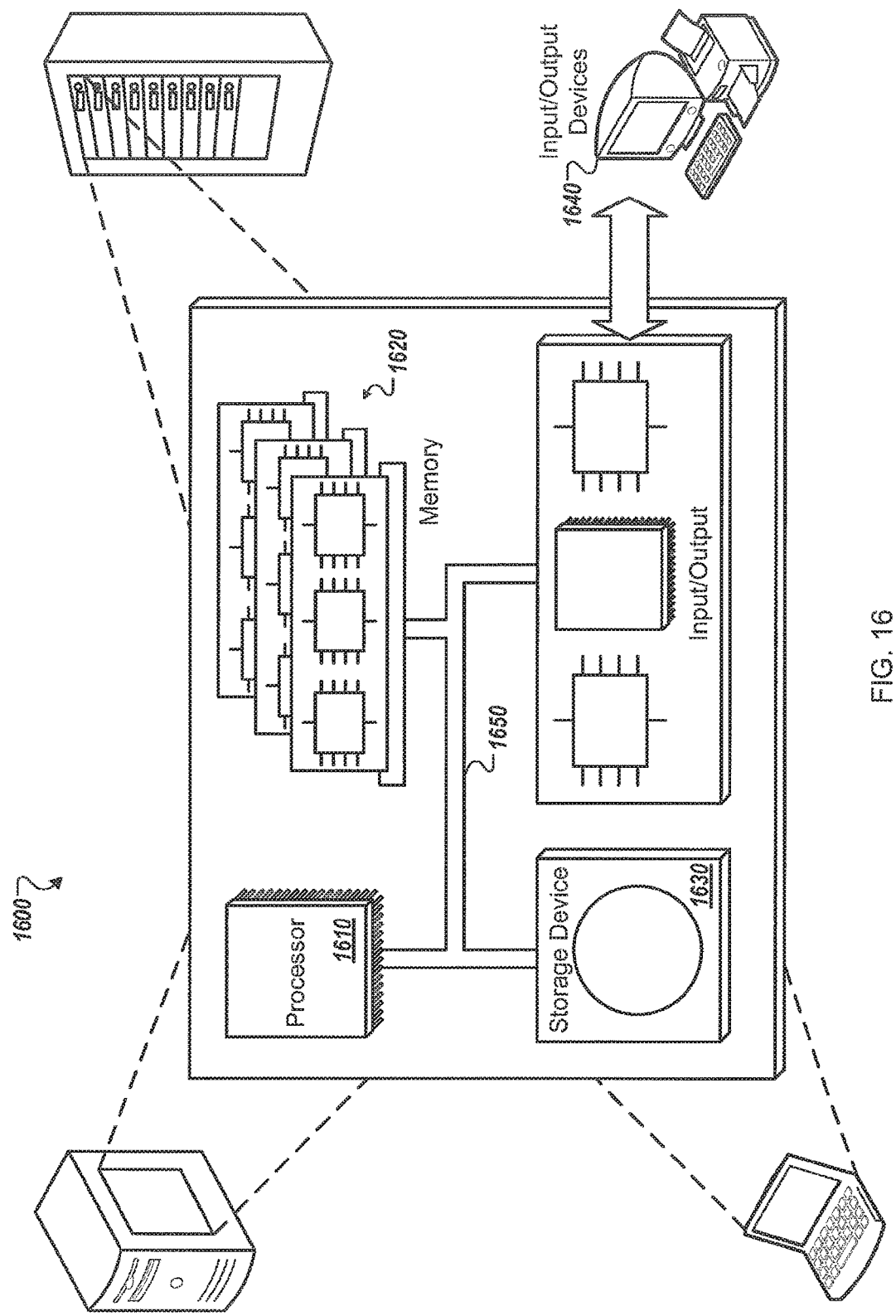
FIG. 16 is a block diagram of a computing system optionally used in connection with computer-implemented methods described in this document.

FIG. 16 is a schematic diagram of a generic computer system 1600. The system 1600 is optionally used for the operations described in association with any of the computer-implemented methods described previously, according to one implementation. The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In one implementation, the memory 1620 is a computer-readable medium. In one implementation, the memory 1620 is a volatile memory unit. In another implementation, the memory 1620 is a non-volatile memory unit.

The storage device 1630 is capable of providing mass storage for the system 1600. In one implementation, the storage device 1630 is a computer-readable medium. In various different implementations, the storage device 1630 is optionally a floppy disk device, a hard disk device, an optical disk device, or a tape device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A system comprising:
    a pressing plate configured to form a plurality of dough products held by a supporting surface by applying a pressure against a first surface of each of the plurality of dough products;
    a skin removably attachable to the pressing plate, wherein the skin is located between the pressing plate and the supporting surface when attached to the pressing plate and is held proximate to the pressing plate with vacuum pressure;
    a seal located around a peripheral edge of the pressing plate that is proximate to the pressing plate and the skin when the skin is held proximate to the pressing plate with vacuum pressure and facilitates creation of the vacuum pressure that holds the skin against the pressing plate, wherein the seal comprises an outer edge and an inner edge, the outer edge of the seal positioned further away from the pressing plate than the inner edge of the seal; and
    a positioning element connected to the pressing plate and configured to move the outer edge of the seal to contact the skin.

2. The system of claim 1, wherein the positioning element comprises an inflatable tube.

3. The system of claim 2, wherein:
    an inner diameter of the inflatable tube is selected so that the inflatable tube presses downward on the seal when the inflatable tube is filled with air and the seal can help create a vacuum seal between the pressing plate and the skin; and
    an outer diameter of the inflatable tube is selected so that the inflatable tube, when deflated, does not press downward on the seal and the vacuum seal between the pressing plate and the skin can be removed when the pressing plate is not forming dough products.

4. The system of claim 2, wherein the inflatable tube is configured to be pneumatically filled with a gas when the pressing plate initially contacts the skin, causing the seal to move downward and contact the skin.

5. The system of claim 1, further comprising:
    a safety coupled to the pressing plate and removably attachable to the skin to prevent detachment of the skin and the pressing plate when the skin is attached to the pressing plate.

6. The system of claim 1, wherein:
    the skin has a thickness between about 0.03125 to 2 inches and is configured to be heated to a temperature of about 150 to 750° Fahrenheit; and
    the supporting surface is maintained at a temperature below the temperature of the skin.

7. The system of claim 1, comprising:
    a plurality of spacers, wherein each of the plurality of spacers is located between the skin and the pressing plate when the skin is attached to the pressing plate, corresponds to one of the plurality of dough products, and has a thermal conductivity between about 5 to 5500 W/(m*K).

8. The system of claim 7, wherein each of the plurality of spacers:
    separates the skin from the pressing plate by a distance selected so that a diameter of each of the plurality of dough products is about the same as the diameter of the other dough products after forming of the plurality of dough products; and
    has a diameter that is the same as the diameters of the other spacers, and a ratio of the diameter of the spacers to the diameter of the dough products is between about 0.1:1 to 1.5:1.

9. The system of claim 8, wherein the diameter of the spacers is smaller than the diameter of the dough products to reduce an amount of the pressure applied to an outer perimeter of each of the plurality of dough products.

10. The system of claim 7, wherein each of the spacers has a thickness selected so that a diameter of each of the plurality of dough products is about the same as the diameter of the other dough products after forming of the plurality of dough products.

11. The system of claim 7, wherein a center vertical axis of each of the plurality of spacers approximately aligns with a center vertical axis of a product that corresponds to the spacer when the pressing plate applies the pressure.

12. The system of claim 7, further comprising:
a spacer adjustment module that determines an adjustment for a distance that one of the plurality of spacers creates between the skin and the pressing plate based on a variance between a current diameter of a product and a desired product diameter, the product from the plurality of dough products and corresponding with the one of the plurality of spacers.

13. The system of claim 1, comprising a flange that connects the positioning element to the pressing plate.

14. The system of claim 1, wherein:
the seal and the positioning element are made from an elastomer that can withstand maximum processing temperatures between about 500 to about 650° F. without deforming;
the seal, the positioning element, or both, have a hardness between about 15 to about 100 Durometer;
the seal, the positioning element, or both, have a tensile strength between about 600 to about 1500 PSI;
the seal has an elongation between about 400% and about 650%; and
the positioning element has an elongation between about 200% to about 400%.

15. A method comprising:
creating, by a product pressing system, a vacuum seal between a pressing plate and a skin,
the product pressing system comprising:
a pressing plate configured to form a plurality of dough products held by a supporting surface by applying a pressure against a first surface of each of the plurality of dough products;
a skin removably attachable to the pressing plate between the pressing plate and the supporting surface when attached to the pressing plate;
a seal i) located around a peripheral edge of the pressing plate that is proximate to the pressing plate and the skin when the skin attached to the pressing plate, ii) that includes an outer edge and an inner edge, the outer edge of the seal positioned further away from the pressing plate than the inner edge of the seal; and
a positioning element connected to the pressing plate; and
creating the vacuum seal comprising:
activating the positioning element to move the outer edge of the seal to contact the skin and facilitate creation of vacuum pressure to hold the skin against the pressing plate; and
enabling a vacuum system to create vacuum pressure between the pressing plate and the skin, the vacuum pressure holding the skin proximate to the pressing plate.

16. The method of claim 15, comprising:
while the vacuum pressure holds the skin proximate to the pressing plate:
forming, by the pressing plate, the plurality of dough products.

17. The method of claim 15, comprising:
aligning the skin with the pressing plate, wherein creating the vacuum seal occurs when the skin is aligned with the pressing plate.

18. The method of claim 15, comprising:
disabling the vacuum system; and
deactivating the positioning element to remove the vacuum pressure between the pressing plate and the skin.

19. The method of claim 15, wherein activating the positioning element comprises activating an inflatable tube to move the outer edge of the seal to contact the skin and facilitate creation of vacuum pressure to hold the skin against the pressing plate.

20. The method of claim 19, wherein activating the inflatable tube comprises filling the inflatable tube with air.

* * * * *